US011403309B2

(12) United States Patent
Smith et al.

(10) Patent No.: US 11,403,309 B2
(45) Date of Patent: Aug. 2, 2022

(54) GENERATING SEGMENTS BASED ON INTELLIGENT SEQUENTIAL DATA

(71) Applicant: Adobe Inc., San Jose, CA (US)

(72) Inventors: Kyle W. Smith, Highland, UT (US); Benjamin R. Gaines, Highland, UT (US); Nathan A. Purser, Highland, UT (US); William Brandon George, Pleasant Grove, UT (US)

(73) Assignee: Adobe Inc., San Jose, CA (US)

( * ) Notice: Subject to any disclaimer, the term of this patent is extended or adjusted under 35 U.S.C. 154(b) by 195 days.

(21) Appl. No.: 14/533,509

(22) Filed: Nov. 5, 2014

(65) Prior Publication Data

US 2016/0125041 A1 May 5, 2016

(51) Int. Cl.
*G06F 16/2458* (2019.01)
*G06Q 30/02* (2012.01)
*G06F 16/23* (2019.01)
*G06F 16/9535* (2019.01)

(52) U.S. Cl.
CPC ...... *G06F 16/2474* (2019.01); *G06F 16/2322* (2019.01); *G06F 16/2471* (2019.01); *G06F 16/9535* (2019.01); *G06Q 30/0254* (2013.01)

(58) Field of Classification Search
CPC .......... G06F 17/30389; G06F 16/2474; G06F 16/2322; G06F 16/2471; G06F 16/9535; G06Q 30/0254
See application file for complete search history.

(56) References Cited

U.S. PATENT DOCUMENTS

| 8,135,722 | B2 | 3/2012 | Error et al. | |
| 2003/0088824 | A1* | 5/2003 | Ayan | G06Q 30/02 715/201 |
| 2004/0122816 | A1* | 6/2004 | Kirkland | G06F 17/3064 |
| 2006/0020886 | A1* | 1/2006 | Agrawal | G06F 17/243 715/256 |
| 2006/0235829 | A1* | 10/2006 | Mirzad | G06F 17/243 |
| 2008/0222283 | A1* | 9/2008 | Ertugrul | G06Q 30/02 709/224 |
| 2009/0037267 | A1* | 2/2009 | Duggal | G06Q 30/02 705/14.48 |

(Continued)

OTHER PUBLICATIONS

Jones et al., "Beyond the Session Timeout: Automatic Hierarchical Segmentation of Search Topics in Query Logs", 2008, ACM, Table 1, pp. 702, 704-705.*

(Continued)

*Primary Examiner* — Etienne P Leroux
(74) *Attorney, Agent, or Firm* — Keller Preece PLLC

(57) ABSTRACT

The present disclosure is directed toward systems and methods that allow users to efficiently and effectively create and identify segments of usage patterns. For example, systems and methods described herein allow marketers to query and return sequential segments including sequence conditions based on user-defined dimension item values. Furthermore, systems and methods described allow marketers to query and return sequential segments including sequential events based on user-defined dimension variables. In addition to the foregoing, systems and methods described herein allow marketers to query and return sequential segments defined by repeated events performed at given regularity or frequency.

20 Claims, 9 Drawing Sheets

(56) References Cited

U.S. PATENT DOCUMENTS

| | | | |
|---|---|---|---|
| 2009/0063284 A1* | 3/2009 | Turpin | G06Q 30/02 705/14.61 |
| 2009/0099932 A1* | 4/2009 | Ahopelto | G06Q 30/0277 705/14.73 |
| 2010/0082657 A1* | 4/2010 | Paparizos | G06F 17/30737 707/767 |
| 2010/0161785 A1* | 6/2010 | Xue | G06F 17/30867 709/224 |
| 2010/0169361 A1* | 7/2010 | Chen | G06F 17/30598 707/769 |
| 2010/0191582 A1* | 7/2010 | Dicker | G06Q 30/02 705/14.51 |
| 2010/0250714 A1* | 9/2010 | Wehmann | G06Q 30/02 709/220 |
| 2011/0093339 A1* | 4/2011 | Morton | G06Q 30/02 705/14.58 |
| 2011/0231873 A1* | 9/2011 | Toebes | H04N 21/252 725/35 |
| 2011/0264598 A1* | 10/2011 | Fuxman | G06Q 30/0281 705/343 |
| 2012/0123867 A1* | 5/2012 | Hannan | G06Q 30/0261 705/14.58 |
| 2012/0259882 A1* | 10/2012 | Thakur | G06F 17/30873 707/767 |
| 2012/0271806 A1* | 10/2012 | Ieong | G06F 17/30867 707/706 |
| 2013/0073400 A1* | 3/2013 | Heath | G06Q 30/02 705/14.73 |
| 2013/0085865 A1* | 4/2013 | Zhou | G06Q 30/02 705/14.66 |
| 2013/0132209 A1* | 5/2013 | Belwadi | G06Q 30/02 705/14.72 |
| 2013/0268357 A1* | 10/2013 | Heath | H04L 63/00 705/14.53 |
| 2014/0122245 A1* | 5/2014 | Qu | G06Q 30/0269 705/14.66 |
| 2014/0201351 A1 | 7/2014 | Fransen | |
| 2014/0244429 A1* | 8/2014 | Clayton | G06Q 30/0631 705/26.7 |
| 2015/0127653 A1* | 5/2015 | Keng | G06F 17/30598 707/740 |
| 2015/0150033 A1* | 5/2015 | Law | H04N 21/44204 725/14 |
| 2016/0217521 A1* | 7/2016 | Hasan | G06F 17/30386 |
| 2016/0217522 A1* | 7/2016 | Jnagal | G06Q 30/0627 |

OTHER PUBLICATIONS

Acquisti et al., "Conditioning Prices on Purchase History", 2005, Marketing Science, vol. 24, No. 3.*

* cited by examiner

GENERATING SEGMENTS BASED ON INTELLIGENT SEQUENTIAL DATA

CROSS REFERENCE TO RELATED APPLICATIONS

N/A

BACKGROUND

1. Technical Field

One or more embodiments relate generally to querying databases. More specifically, one or more embodiments relate to generating segment definitions and filtering data set based on the segment definitions.

2. Background and Relevant Art

Internet users access millions of websites daily for a variety of purposes. Internet users access websites for purposes such as commerce, information, and entertainment. In fact, it is not uncommon for Internet users to conduct a large portion of their daily tasks (e.g., shopping, news, recipes, exercise, etc.) via various websites. Additionally, users access networks to transfer files, submit search queries, upload pictures and other electronic media, or send social network posts. Each of these tasks, in addition to countless other tasks, require users to utilize various network connections and servers.

In light of widespread and daily network usage, webpage administrators and marketers generally desire to analyze specific segments of the users who utilize various webpages in order to uncover a wealth of information. For example, a webpage administrator may desire to discover a segment of users who view certain websites in a certain order. Additionally, a webpage administrator may want to determine whether more network traffic comes to a website via a search engine (i.e., as a result of a search engine search) or via a paid advertisement displayed on another website. In some cases, a webpage administrator may desire to discover a specific segment including network users who have demonstrated a pattern of behaviors.

Segmenting web analytics data based on such criteria can yield results that are powerful and extremely useful. In response to determining a specific segment of network users, a webpage administrator may alter a marketing campaign, change a display layout, associate a website with another website, target specific users, etc. In other words, segment analysis can yield higher numbers of network visitors, increased product sales, better advertisement revenue, and so on.

Unfortunately, the amount of analytic data collected for even a single website can become unwieldy and difficult to manage or mine, particularly when the website has thousands, millions, or even billions of daily visitors. Conventional methods of generating segments lack the specificity and granularity needed to create specific segments that meet specific and sophisticated parameters. Often times if a webpage administrator desires to create a specific or sophisticated segment, the webpage administrator must be able to program code or rule sets to generate the segment. Furthermore, such customized segmenting is often time consuming and does not allow the administrator to easily change or revise the segment.

Thus, there are several disadvantages to current methods for defining and generating segments users or user actions.

SUMMARY

One or more embodiments described herein provide benefits and/or solve one or more of the foregoing or other problems in the art with systems and methods that allow users to efficiently and effectively create and identify segments of usage patterns. For example, systems and methods described herein involve sequential segments that identify usage patterns based on sequences of hits, events, and visits. More particularly, systems and methods described herein involve advanced sequential segmentation that allows for sequence conditions based on user-defined dimension item values. For example, rather than just being able to query and return segments defined by sequence conditions based on a number of products purchased or page visits, systems and methods described herein allow for sequential segments based on particular products purchased or particular pages visited.

Furthermore, systems and methods described herein provide for advanced sequential segmentation that allows for segments with sequential events based on user-defined dimension variables. For example, rather than just being able to query and return segments defined by sequential events based on a particular dimension item value, systems and methods described herein allow segments of a plurality of sequential events each based on the same dimension item value without specifying the dimension item value.

In addition to the foregoing, systems and methods described herein provide for advanced sequential segmentation that allows segments defined by repeated events performed at given regularity or frequency. For example, rather than just being able to query and return segments defined by a sequence of single events, systems and methods described herein allow for segments that indicate users who perform one or more given events repeatedly over a given time period. Furthermore, the systems and methods described herein allow for segments based on regularity or frequency based on user-defined dimension variables.

Thus, systems and methods described herein allow marketers to query and return segments with greater granularity and specificity. The greater granularity and specific allow marketers do in-depth analysis and apply accurate targeting to their user-base. By allowing for sophisticated segmentation definition criteria based on sequential information, marketers gain the ability to fine tune their analytics and targeting capabilities.

Additional features and advantages will be set forth in the description which follows, and in part will be obvious from the description, or may be learned by the practice of such exemplary embodiments. The features and advantages of such embodiments may be realized and obtained by means of the instruments and combinations particularly pointed out in the appended claims. These and other features will become more fully apparent from the following description and appended claims, or may be learned by the practice of such exemplary embodiments as set forth hereinafter.

BRIEF DESCRIPTION OF THE DRAWINGS

In order to describe the manner in which the above recited and other advantages and features of the invention can be obtained, a more particular description of the invention briefly described above will be rendered by reference to specific embodiments thereof that are illustrated in the appended drawings. It should be noted that the figures are not drawn to scale, and that elements of similar structure or function are generally represented by like reference numerals for illustrative purposes throughout the figures. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION

Figure 1:
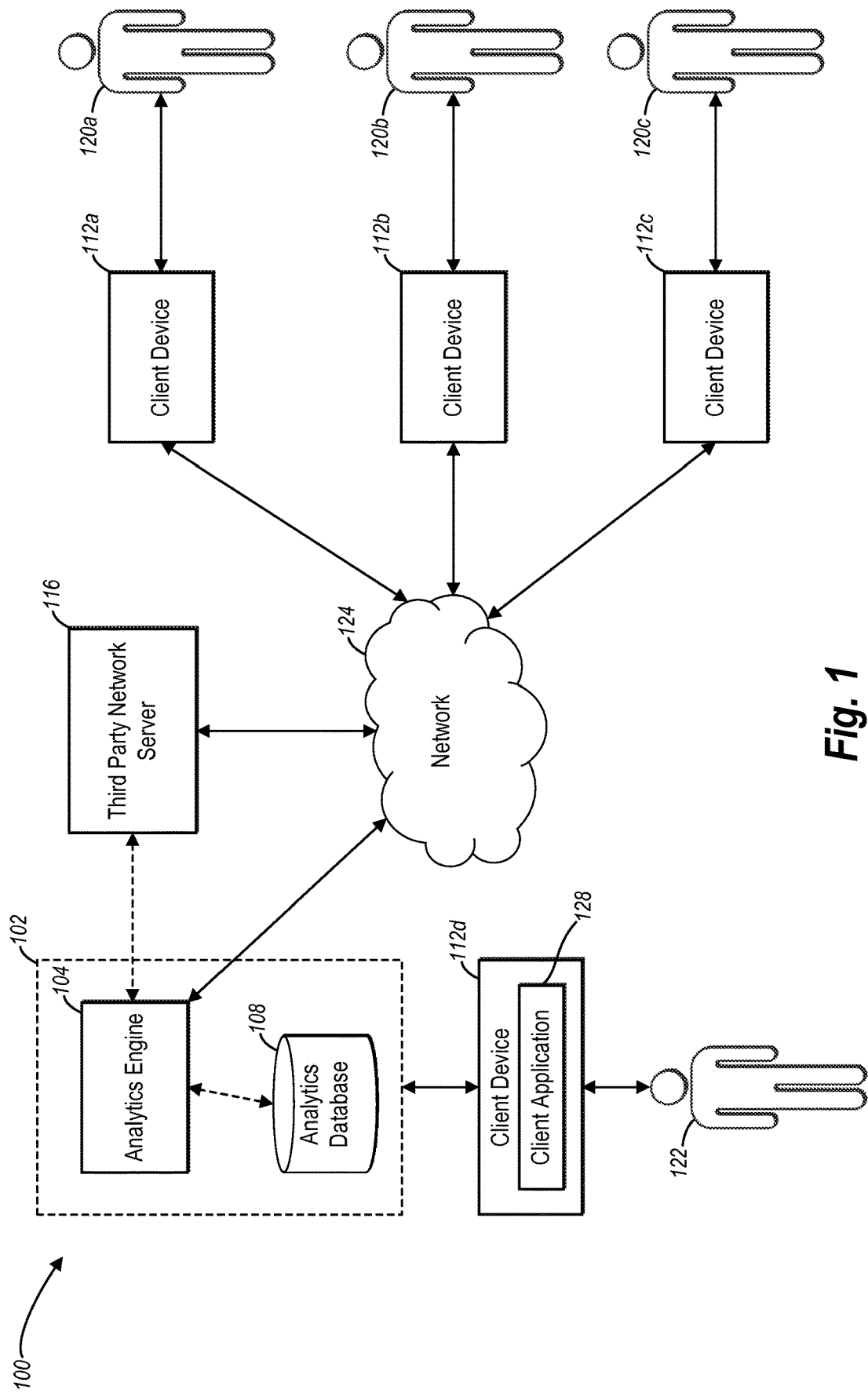
FIG. 1 illustrates a block diagram of an environment in which an analytics system can operate in accordance with one or more embodiments.

One or more embodiments described herein include an analytics engine that allows users to efficiently and effectively create and identify segments of usage patterns. For example, the analytics engine can allow for sequential segments that identify usage patterns based on sequences of hits, events, and visits. More particularly, the analytics engine provides for advanced sequential segmentation that includes sequence conditions based on user-defined dimension item values. For example, rather than just being able to query and return segments defined by sequence conditions based on a number of products purchased or page visits, the analytics engine allows marketers to query and return sequential segments based on particular products purchased or particular pages visited.

In an exemplary embodiment, the analytics engine can provide a segment-query building graphical-user-interface that allows a marketer to build a segment query including a first event and a second event. The segment-query building graphical-user-interface can further allow the marketer to select a sequence condition and define the sequence condition by one or more specific dimension item values. Based on the segment query, the analytics engine can query an analytics database for a segment of users who performed the first event followed by the second event in accordance with the sequence condition defined by the one or more specific dimension item values.

One specific example of the foregoing embodiment includes a segment defined by visiting a first webpage (a first event), followed by visiting a second webpage (a second event), where the visit to the second webpage is after two purchases (a sequence condition) of a cell phone (a specific dimension item value). The analytics engine can allow the marketer to further tailor the segment. For instance rather than have a single dimension item value, the two purchases can be defined by a plurality of dimension item values (e.g., a purchase of any two of a cell phone, a tablet, and a laptop computer). Still further, the analytics engine can allow for more complicated or nested sequence conditions, such as after/within clauses. In such cases either or both of the after/within clauses can be defined by one or more specific dimension item values.

Furthermore, an analytics engine can provide for advanced sequential segmentation that allows for segments with sequential events based on user-defined dimension variables. For example, rather than just being able to query and return segments defined by sequential events based on a particular dimension item value, systems and methods described herein allow segments of a plurality of sequential events each based on the same dimension item value without specifying the dimension item value.

In an exemplary embodiment, the analytics engine can provide a segment-query building graphical-user-interface that allows a marketer to build a segment query including an initial event and a subsequent event. The segment-query building graphical-user-interface can further allow the marketer to define the initial and subsequent events by the same dimension item variable. Based on the segment query, the analytics engine can query an analytics database for a segment of users who performed the initial event defined by the dimension item variable and then performed the subsequent event defined by the dimension item variable.

One specific example of the foregoing embodiment includes a segment defined by visiting a product webpage (an initial event defined by a dimension item variable) and then purchasing the product (a subsequent event defined by the dimension item variable). The analytics engine can return any visitors who visited any product page and then later purchased the product. Thus, the use of the dimension item variable can allow a marketer to discover such visitors for all products in a single segment query. Additionally, the dimension item variable can include a dimension item type (e.g., electronics, books, furniture), a regular expression, or an array of possible values. The analytics engine can allow the marketer to further tailor the segment with sequence conditions. For instance, the segment can include users who visit a first product webpage, then perform a search (sequence condition), and then return to the first product webpage.

In addition to the foregoing, the analytics engine can provide for advanced sequential segmentation that includes segments defined by repeated events performed at given regularity or frequency. For example, rather than just being able to query and return segments defined by a sequence of single events, the analytics engine can provide for segments that indicate users who perform one or more given events repeatedly over a given time period. Furthermore, the analytics engine can allow for segments based on regularity or frequency based on user-defined dimension variables.

In an exemplary embodiment, the analytics engine can provide a segment-query building graphical-user-interface that allows a marketer to build a segment query including a segment rule and a frequency threshold. The segment-query building graphical-user-interface can further allow the marketer to define the frequency threshold as a number of times the segment rule is satisfied. Based on the segment query, the analytics engine can query an analytics database for a segment of users who satisfy the segment rule within the frequency threshold. One specific example of the foregoing embodiment includes a segment defined by users who visit a BMX bike product webpage (a segment rule) at least once a week for at least two weeks. Rather than specifying a dimension item value, the analytics engine can allow the marketer to use a dimension item variable as discussed above.

Thus, the analytics engine described herein can allow marketers to query and return segments with greater granularity and specificity. The greater granularity and specific allow marketers do in-depth analysis and apply accurate targeting to their user-base. By allowing for sophisticated segmentation definition criteria based on sequential information, marketers gain the ability to fine tune their analytics and targeting capabilities.

As used herein a "segment" refers to a subgroup of a set of users whose network activities have been tracked and stored in a database. More specifically, a segment is a subgroup of users whose activities meet or are responsive to a segment query. For example, an embodiment described herein may track and store information related to activities of certain users (e.g., website paths utilized by the website users, clicks per minute, time spent on a single webpage, purchases made, etc.). Later, an administrator may query the stored information to retrieve a specific segment of the users who made a purchase within five minutes of first visiting the website. An embodiment described herein can return a range of information related to users whose actions on the website are responsive to the query. Thus, the administrator can more closely analyze the returned segment of website users in order to determine how to better optimize the website for users who make quick purchases.

Accordingly, as used herein, a "segment query" refers to a request for information from a database that is related to a segment, or subgroup, of users. More specifically, a segment query refers to a structured group of parameters that indicate specific types of information that should be identified within the database. Additionally, in one or more embodiments, a segment query may include sequential conditions, unique dimension item values, dimension item variables, frequency conditions and so on in order to return a specific and granular level of information from the database.

As used herein, an "event" is an action performed by a user that can be tracked and stored. Some examples of events can include, but are not limited to, a webpage view, a product purchase, a web search, a link click, an application download, an amount of time spent on a given web page, a first time visit, a visitor from a search engine or a social networking site, etc.

As used herein, a "sequence condition" is a rule or expression that defines a relationship between two or more events. In particular, a sequence condition is a rule or expression that defines an order, time, or other sequential relationship between two or more events. For example, a sequence condition may specify an order in which events take place, a time between events etc. Examples of sequence conditions include "then," "within," "before," "after," etc.

As used herein, a "dimension" refers to a component or category of data. Example dimensions include products, webpages, gender, geographic locations, purchases, downloads, age, campaigns, etc. A "dimension item value" refers to a particular item in a dimension. For example, a dimension item value can be a particular product, webpage, gender, geographic location, purchase, download, age, etc. A "dimension item variable" refers to a variable that takes the place a particular dimension item value. A "dimension item type" refers to a type of dimension item. As an example for the foregoing, a dimension can be "products," a dimension item value can be BMX bikes, a dimension item type can be sporting goods, and a dimension item variable can be product "A."

FIG. 1 is a schematic diagram illustrating a system 100 in accordance with one or more embodiments. As illustrated in FIG. 1, the system may include an analytics system 102; client devices 112a, 112b, 112c, 112d; third party network server(s) 116 (e.g., web server(s)), users 120a, 120b, 120c, an administrator 122, and a network 124 (e.g., the Internet). As further illustrated in FIG. 1, the client devices 112a-112c can communicate with the third-party network server(s) 116 and the analytics engine 104 through the network 124. Although FIG. 1 illustrates a particular arrangement of the users, the client devices, the network 124, the third-party network server(s) 116, and the analytics system 102, various additional arrangements are possible. For example, the client devices 112a-112c may directly communicate with the third-party network server(s) 116, bypassing the network 124. Similarly, the client device 112d can communicate with the analytics system 102 via the network 124 rather than directly as shown by FIG. 1.

Additionally, while FIG. 1 illustrates three users, the system 100 can include more than three users 120a-120c. In particular, the users 120a-120c are users who access one or more of websites, content, or support provided by the third party server(s) 116. Thus, the system 100 can include hundreds, thousands, millions, or even billions of users.

As shown the analytics system 102 can include an analytics engine 104 and an analytics database 108. The analytics engine 104 may manage and query data representative of some or all of the users 120a-120c. Additionally, the analytics engine 104 may manage and query data representative of other users associated with the third-party network server(s) 116. Furthermore, in one or more embodiments, the users 120a-120c can interact with the client devices 112a-112c, respectively. Examples of client devices may include, but are not limited to, mobile devices (e.g., smartphones, tablets), laptops, desktops, or any other type of computing device, such as those described below in relation to FIG. 7. Similarly, the network 124 can comprise any of the networks described below in relation to FIG. 7

In one or more embodiments, the client devices 112a-112c may communicate with the third-party network server(s) 116 for a variety of purposes. For example, the third-party network server(s) 116 can comprise or support a web server, a file server, a social networking system, a program server, an application store, a content provider, etc. Thus, in one or more embodiments, the client devices 112a-112c communicate with the third-party network server(s) 116 for purposes such as, but not limited to, requesting a web page, uploading a file, updating a profile, downloading a game, and so forth. For example, in one or more embodiments the third-party network server(s) 116 can comprise a web server for an ecommerce business. In that example, a user 120 may communicate with the web server by requesting web pages from the web server for display via a web browser operating on a client device.

In one or more embodiments, the analytics system 102 may track various user data related to the communications between the client devices 112a-112c and the third-party network server(s) 116. For example, the analytics system 102 may track user data including, but not limited to, data requests (i.e., URL requests, link clicks, etc.), time data (i.e., when a link was clicked, how long a user stayed on a webpage, when an application was closed, etc.), path tracking data (i.e., what web pages a user visits during a given session, etc.), demographic data (i.e., an indicated age of a user, an indicated sex of a user, an indicated socioeconomic status of a user, etc.), geographic data (i.e., where a user is located, etc.), and transaction data (i.e., the types of purchases a user makes, etc.). For instance, in one or more embodiments, the third-party network server(s) 116 can comprise a webserver. In such instances, the client device 112a may communicate with the third-party network server(s) 116 in order to request webpage information in order to display a certain webpage to the user 120a via the client device 112. In that case, the analytics system 102 may track the information request (i.e., for the webpage), the time the request was made, the geographic information associated with client device 112a (e.g., a geographic area associated with an IP address assigned to the client device 112a or GPS information identifying a location of the client device 112a), and/or any demographic data associated with the user 120a.

The analytics system 102 can track user data in various ways. In one or more embodiments, the third-party network server(s) 116 can track the user data and then report the tracked user data to an analytical server, such as the analytics engine 104 (i.e., via the dashed line illustrated in FIG. 1). Alternatively, the analytics system 102 may receive tracked user data directly from the client devices 112a-112c. In particular, the analytics system 102 may receive information via data stored on the client device (i.e., a browser cookie), embedded computer code (i.e., tracking pixels), a user profile, or engage in any other type of tracking technique. Thus, the analytics engine 104 can receive tracked user data from the third-party network server(s) 116, the network 124, and/or the client devices 112a-112c.

To allow for sequential segmentation, the analytics engine 104 can obtain all fallout checkpoints (with each unique dimension+item or event associated at each node). The analytics engine 104 can create a sequencing stream with each of the checkpoints (dimension+item1 THEN dimension+item2 THEN dimension+item3, etc.). The analytics engine 104 can then apply this stream to either a visitor or visit context. Additionally, the analytics engine 104 can serialize into a segment definition format, readily available to apply to metric data. In a path-match scenario, the analytics engine 104 can automatically create a segment by obtaining all checkpoints matched in the path (this may contain wildcard characters, with constraints such as "any 1 page" or "any 2 pages"). The analytics engine 104 can create a sequencing stream with each of the checkpoints (this will can include special rules for wildcard characters, such as "Page exists AND Page Depth=1" within a separate container). The analytics engine 104 can then apply this stream to either a visitor or visit context. Finally, the analytics engine 104 can serialize into a segment definition format, readily available to apply to metric data.

Also illustrated in FIG. 1, the analytics engine 104 is communicatively coupled with an analytics database 108. In one or more embodiments, the analytics engine 104 may store tracked user data to and query tracked user data from the analytics database 108. In one or more embodiments, the analytics database 108 is separately maintained from the analytics engine 104 as shown in FIG. 1. Alternatively, in one or more embodiments, the analytics engine 104 and the analytics database 108 can comprise a single combined system, subsystem, or device.

Furthermore, as shown in FIG. 1, the system 100 may include a client device 112d that operates a client application 128. In one or more embodiments, an administrator 122 or other user may query segment data from the analytics engine 104 via the client device 112d. In one or more embodiments, the analytics engine 104 may provide various graphical user interface controls to the client application 128 at the client device 112d in order to help the administrator 122 build segment queries. Additionally, the analytics engine 104 may receive and process segment queries from the client application 128, and provide query results based on the segment query. This process is described in greater detail below with reference to FIGS. 2, and 3A-3C.

Figure 2:
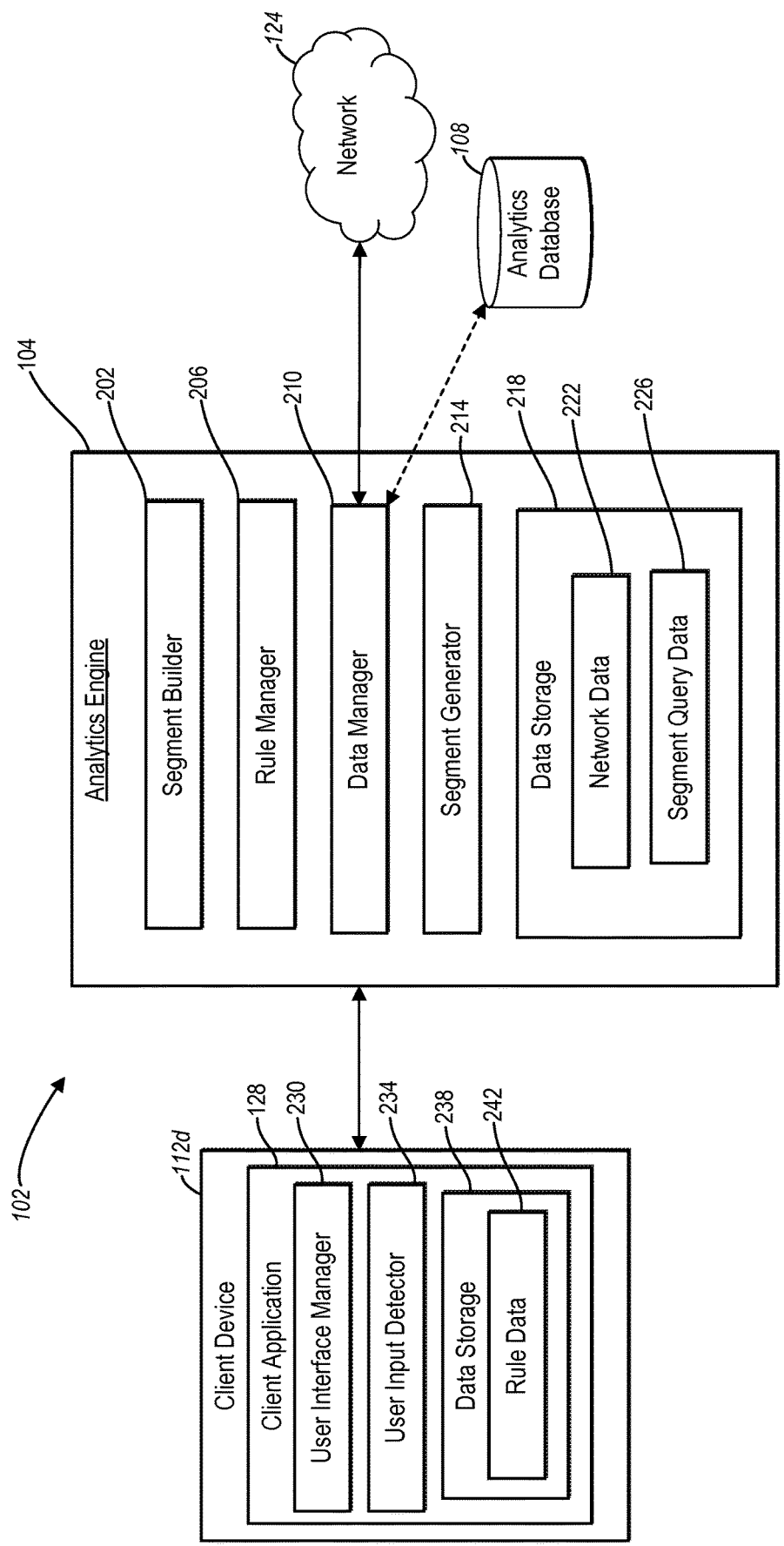
FIG. 2 illustrates a schematic diagram of the analytics system of FIG. 1 in accordance with one or more embodiments.

FIG. 2 illustrates a schematic diagram illustrating an example embodiment of the analytics system 102. As shown, the analytics system 102 may include, but is not limited to, the analytics engine 104 communicatively coupled to the network 124, and the analytics database 108. The analytics system 102 can also include or support a client application 128 running on the client device 112d. The analytics engine 104 can include, but is not limited to, a segment builder 202, a rule manager 206, a data manager 210, a segment generator 214, and data storage 218. Additionally, the analytics system 102 can include or be coupled to the analytics database 108. Although the disclosure herein shows the components 108, 202-218 to be separate in FIG. 2, any of the components 108, 202-218 may be combined into fewer components, such as into a single facility or module, or divided into more components as may serve one or more embodiments. In addition, the components 108, 202-218 may be located on, or implemented by, one or more computing devices, such as those described below in relation to FIG. 7.

The components 108, 202-218 can comprise software, hardware, or both. For example, the components 108, 202-218 can comprise one or more instructions stored on a computer readable storage medium and executable by a processor of one or more computer devices. When executed by the one or more processors, the computer-executable instructions of the analytics system 102 can cause a computing device(s) to perform the methods described herein. Alternatively, the components 108, 202-218 can comprise hardware, such as a special-purpose processing device to perform a certain function. Additionally or alternatively, the components 108, 202-218 can comprise a combination of computer-executable instructions and hardware.

As mentioned above, and as shown in FIG. 2, the analytics engine 104 can include a segment builder 202. The segment builder 202 can communicate with the client application 128 in order to receive user inputs and provide segment query building controls to the client application 128 in order to facilitate the building or configuring of a segment query. For example, in one or more embodiments, a user may begin building a segment query by indicating what type of segment query the user wants to build. In response to receiving the indication of the type of segment query, the segment builder 202 can determine the appropriate segment query building controls applicable for the type of segment query the user wants to build, and provide the appropriate segment query building controls to the client application 128. Additionally or alternatively, the segment builder 202 can also receive and format drag-and-drop segment query building controls in order to build a segment query.

As used herein, a segment query building control can be any type of interactive input control included as part of a GUI. Some examples of segment query building controls include, but are not limited to, text boxes, drop down lists, radio buttons, spinners, keyboards, numerical keypads, etc. In one or more embodiments, in order to facilitate building a segment query, the segment builder 202 can provide and/or format certain combinations of segment query building controls to the client application 128 in order to assist a user in building a segment query with appropriate values, formatting, grammars, etc.

For example, a user may indicate a desire to build a segment query that, when processed by the analytics engine 104, identifies users who visited two websites in a specific order and within a specific time-frame. In response to this indication, the segment builder 202 can provide the appropriate segment query building controls that will allow the user to configure the specific type of segment query indicated. For example, the segment builder 202 can provide segment query building controls for the user to indicate the two websites, configure the specific order and the specific time frame. Thus, the segment builder 202 can prevent the user from configuring segment query portions that are outside the scope of the originally indicated segment query. As such, the segment builder 202 essentially guides the user in configuring a segment query that is specifically tailored to the user's intentions.

Additionally, the segment builder 202 can receive configured segment queries from the client application 128. For example, in one or more embodiments, a user may submit a configured segment query from the client application 128 to the analytics engine 104 via the segment builder 202 in order to receive a query result. In one or more embodiments, the segment builder 202 may receive the configured segment query from the client application 128, and pass the configured segment query to the rule manager 206 for further processing.

As mentioned above, and as shown in FIG. 2, the analytics engine 104 can also include a rule manager 206. The rule manager 206 can receive a configured segment query from the segment builder 202 and perform a final error check on the configured segment query. In one or more embodiments, even though the segment builder 202 can prevent the user from configuring segment query portions that are outside the scope of the originally indicated segment query, it is still possible that a completed segment query will contain errors related to syntax, format, etc. For example, the rule manager 206 can parse the configured segment query in order to determine whether the query satisfies various rules of structure and format for queries submitted to a database (e.g., such as those associated with a structured query language). Thus, the rule manager 206 may ensure the configured segment query can be successfully processed without causing any run-time errors in the analytics engine 104.

Additionally, the rule manager 206 may present the configured segment query in a format that can be optimally processed by the analytics engine 104. For example, in one or more embodiments, the configured segment query received from the client application 128 may include one or more unique dimension item values. As used herein, a unique dimension item value can be a user-defined variable. For instance, the analytics engine 104 may receive a configured segment query that identifies a segment of website visitors who visit a first page, and then after two hours but within two purchases visit a second page. In this case, "purchases" is a unique dimension item value that, without definition, may refer to any product. In order to more narrowly refine the results of this search query, a user may submit a definition for the dimension item value "purchases," such as "where purchases equal a bike, a TV, or a computer," thus narrowing the segment query to website visitors who visit a first page, and then after two hours but within two purchases visit a second page, where purchases equal a bike, a TV, or a computer.

When the analytics engine 104 receives a segment query utilizing a unique dimension item value as well as a definition for the unique dimension item value, the rule manager 206 can format the segment query for optimal processing. For example, in the above example, a segment query may identify website visitors who visit a first page, and then after two hours but within two purchases visit a second page, where purchases equal a bike, a TV, or a computer. Thus, the possible combinations of purchases that a website visitor must have made in order to identified by the analytics engine 104 processing this segment query are: bike+TV, TV+computer, bike+computer, two bikes, two computers, or two TVs. In one or more embodiments, the rule manager 206 may create and process segment queries based on this determination. For example, the rule manager 206 may create a first segment query (e.g., "website visitors who visit a first page, and then after two hours but within the purchase of a bike and a TV visit a second page"), a second segment query (e.g., "website visitors who visit a first page, and then after two hours but within the purchase of a TV and a computer visit a second page"), a third segment query (e.g., "website visitors who visit a first page, and then after two hours but within the purchase of a bike and a computer visit a second page"), and so forth.

Regardless of the type or definition of a unique dimension item value, the rule manager 206 may utilize the unique dimension item value to simplify a segment query into its most easily processed state. In one or more embodiments, a unique dimension item value may be a set of values, an equation, a regular expression, a conditional statement, other Boolean operators, and so forth. The rule manager 206 can parse and simplify the segment query such that the analytics engine 104 can target the intended segment. Additionally, the rule manager 206 can store the corrected segment query along with any dimension item value definitions and simplified segment queries associated with the corrected segment query, as will be described in more detail below.

As mentioned above, and as shown in FIG. 2, the analytics engine 104 can include a data manager 210. The data manager 210 can receive, organize, and store user data from the network 124, from the third-party network server(s) 116, and/or the client devices 112a-112c, as described above (i.e., the data manager 210 can perform read/write functions in connection with a database). For example, in one or more embodiments, the analytics engine 104 may receive user data related to website usage provide or supported by the third-party network server(s) 116. Such user data may include information such as, but not limited to, click data, timestamp data, demographic data, geographic data, transactional data, etc. In one or more embodiments, the data manager 210 can organize this data according to any of the data type, the user, the timestamp, etc. Once organized, the data manager 210 can store the received user data in the analytics database 108.

Additionally, the data manager 210 can identify information within the analytics database 108 based on a segment query. As described above, the rule manager 206 can finalize segment queries and send those queries to the data manager 210 for processing. In one or more embodiments, the data manager 210 can receive a segment query from the rule manager 206, and query the analytics database 108 in order to identify stored user data that satisfies the received segment query. Once the appropriate user data is identified, the data manager 210 may also store the query results for later access.

As used herein and as mentioned above, a segment query refers to a request for information from a database. More specifically, a segment query refers to a structured group of parameters that indicate a specific type of information that the data manager 210 will identify within the analytics database 108. For example, the rule manager 206 may format segment queries according to any type of query language (i.e., SQL, Datalog, COQL, HTSQL, XQuery, etc.), or in any manner suitable for extracting information from a database. Segment queries may include unique dimension item values (i.e., user-defined variables), conditional statements, and other parameters.

The data manager 210 can process segment queries that include a wide range of parameters. For example, the data manager 210 may process a segment query that refers to one or more user events. In one or more embodiments, a user event is an action performed by a user that is tracked (e.g., a click, a purchase, a page landing, a search, a download, etc.) Additionally, the data manager 210 can process a segment query that refers to one or more conditional statements. In one or more embodiments, a conditional statement lists one or more premises that must be true in order for the condition to be satisfied. For example, a conditional statement may require a second user event to be performed "after two hours but within two purchases" of a first user event.

In one or more embodiments, the data manager 210 can process segment queries that are sequential. A sequential segment query is a query that identifies users who perform certain events in a certain order. For example, a sequential segment query may be one that causes the data manager 210 to identify users who look at a first webpage, then look at a second webpage, and then look at a third webpage. In one or more embodiments, this query may not cause the data manager 210 to identify users who looked at the first, second, and third pages with other pages interspersed. Likewise, this query may not cause the data manager 210 to identify users who looked at the first, second, and third pages in any other sequence.

Additionally, data manager 210 can process nested segment queries. A nested segment query can be a query within a query. For example, a nested segment query that includes an inner sequential query that identifies users who performed certain events in a certain order, and an outer query that identifies users from the results of the inner sequential query who also performed certain event(s). Accordingly, a nested segment query may include any number of queries in order to narrow a segment of users. Thus, the data manager 210 may process queries that include any combination of sequential or nested elements in order to identify specific and targets groups of users in the analytics database 108.

As mentioned above, and as shown in FIG. 2, the analytics engine 104 can include a segment generator 214. The segment generator 214 can receive segment query results from the data manager 210, format the segment query results, and provide the formatted segment query results to the client application 128. For example, in one or more embodiments, the data manager 210 may identify a wide range user data in the analytics database 108 that satisfies a segment query. However, the identified user data, in its raw form, may not hold much meaning to a user. Thus, segment generator 214 can generate a meaningful representation of the identified data.

For example, using a segment query discussed above, the data manager 210 may identify user data in the analytics database 108 that satisfies a query directed toward web website visitors who visit a first page, and then after two hours but within the purchase of a bike and a TV visit a second page. User data that satisfies this segment query may identify users who performed the queried events today, users who performed the queried events last week, and users who performed the queried events last year. Accordingly, in one or more embodiments, the segment generator 214 may create a segment report that organizes the identified users chronologically. Additionally or alternatively, the segment generator 214 may include other types of information associated with the identified users such as, but not limited to, profile data associated with the identified users, demographic data associated with the identified users, geographic data associated with the identified users and so on. In one or more embodiments, the segment generator 214 can present query results in various formats, such as in text, in charts, in graphs, etc. Thus, the segment generator 214 can provide meaningful information to the client application 128, rather than a simple list of data results.

As discussed above, and as shown in FIG. 2, the analytics engine 104 can also include a data storage 218. The data storage 218 may maintain network data 222, as well as segment query data 226. In one or more embodiments, network data 222 may include user data identified by the data manager 210 that satisfies a segment query. Furthermore, in one or more embodiments, the segment query data 226 may include segment queries received by the analytics engine 104, as well as corrected and simplified segment queries and dimension item value definitions utilized by the data manager 206. The data storage 218 may organize the network data 222 and the segment query data 226 such that query results stored as network data 222 correspond to their associated segment query in the segment query data 226.

Furthermore, as mentioned above, the analytics system 102 can also include or support a client application 128 running on a client device 112d. As shown, the client application 128 may include, but is not limited to, a user interface manager 230, an input detector 234, and a data storage 238. In general, the analytics system 102 can allow a user/administrator of the client device 112d to utilize the analytics engine 104 via the client application 128 to format a segment query. Additionally, the segmenting system 100 can allow a user of the client device 112d to receive query results from the analytics engine 104 via the client application 128.

The components 230-238 can comprise software, hardware, or both. For example, the components 230-238 can comprise computer instructions stored on a non-transitory computer-readable storage medium and executable by at least one processor of the client device 112d. When executed by the at least one processor, the computer-executable instructions can cause the client device 112d to perform the methods and processes described herein. Alternatively, the components 230-238 can comprise hardware, such as a special purpose processing device to perform a certain function or group of functions. Additionally or alternatively, the components 230-238 can comprise a combination of computer-executable instructions and hardware.

In one or more embodiments, the client application 128 can be a native application installed on the client device 112d. For example, the client application 128 may be a mobile application that installs and runs on a mobile device, such as a smart phone or a tablet. Alternatively, the client application 128 can be a desktop computer application, widget, or other form of a native computer program. Alternatively, the client application 128 may be a remote application that the client device 112d accesses. For example, the client application 128 may be a web application that is executed within a web browser of the client device 112d.

As mentioned above, and as shown in FIG. 2, the client application 202 can include a user interface manager 230.

The user interface manager 230 can provide, manage, and/or control a graphical user interface (or simply "user interface") that allows a user to configure segment queries and receive segment query results and reports from the analytics engine 104. For example, the user interface manager 230 can provide a user interface that facilitates the composition of a segment query. Likewise, the user interface manager 230 can provide a user interface that displays segment query results provided by the analytics engine 104.

More specifically, the user interface manager 230 may facilitate the display of a user interface (e.g., by way of a display device associated with the client device 112d). For example, the user interface can comprise a plurality of graphical components, objects, and/or elements that allow a user to interact with the analytics engine 104. Particularly, the user interface manager 230 may direct the client device 112d to display a group of graphical components, objects and/or elements as directed by the segment builder 202 of the analytics engine 104, as described above.

To illustrate, in response to a user indicating a specific type of segment query, the segment builder 202 may provide a variety of segment query building controls to the user interface manager 230, and the user interface manager 230 may in turn display those segment query building controls to the user of the client application 128. Similarly, the user interface manager 230 may receive and display updates to query building controls provided by the segment builder 202. Thus, under the direction of the segment builder 202, the user interface manager 230 can display or remove from display various segment query building controls in order to assist a user in configuring or building a segment query.

Additionally, the user interface manager 230 can display segment query results. For example, as described above, the segment generator 214 can format raw data identified by the data manager 210 to be responsive to a segment query. In other words, the segment generator 214 may format raw data into charts, graphs, textual summaries, etc. In one or more embodiments, the segment generator 214 can provide the formatted raw data to the user interface manager 230 for display to the user.

As further illustrated in FIG. 2, the client application 128 can include a user input detector 234. In one or more embodiments, the user input detector 234 can detect, receive, and/or facilitate user input in any suitable manner. In some examples, the user input detector 234 can detect one or more user interactions with respect to the user interface. As referred to herein, a "user interaction" means a single interaction, or combination of interactions, received from a user by way of one or more input devices.

For example, user input detector 234 can detect a user interaction from a keyboard, mouse, touch pad, touch screen, and/or any other input device. In the event the client device 112d includes a touch screen, the user input detector 234 can detect one or more touch gestures (e.g., swipe gestures, tap gestures, pinch gestures, or reverse pinch gestures) from a user that forms a user interaction. In some examples, a user can provide the touch gestures in relation to and/or directed at one or more graphical objects or graphical elements of a user interface.

The user input detector 234 may additionally, or alternatively, receive data representative of a user interaction. For example, the user input detector 234 may receive one or more user configurable parameters from a user, one or more user commands from the user, and/or any other suitable user input. The user input detector 234 may receive input data from one or more components of the client application 128, from the storage on the client device 112d, or from one or more remote locations (e.g., the analytics engine 104).

The client application 128 can perform one or more functions in response to the user input detector 234 detecting user input and/or receiving other data. Generally, a user can control, navigate, and otherwise use the client application 128 by providing one or more user inputs that the user input detector 234 can detect. For example, in response to the user input detector 234 detecting user input, one or more components of the client application 128 allow the user to view data, interact with segment query building controls, or submit segment queries. In addition, in response to the user input detector 234 detecting user input, one or more components of the client application 128 allow a user to navigate through one or more user interfaces to build or configure a segment query.

In one or more embodiments, in response to the user input detector 234 detecting one or more user inputs, the client application 128 can facilitate the analytics engine in assisting the user in building a segment query. For example, a user may provide input (e.g., via a button click, a list item selection, etc.) indicating a type of segment query the user desires to build. In response to the user input detector 234 detecting the input, the segment builder 202 may provide segment query building controls to the user interface manager 128 that are appropriate to the type of segment query indicated. Following this, in one or more embodiments, the user input detector 234 may detect further inputs from the user, which in turn, prompt further updates from the segment builder 202 displayed by the user interface manager 230. Thus, in response to user inputs detected by the user input detector 234, the client application 128 can facilitate guiding a user in appropriately configuring a segment query.

As mentioned above, and as illustrated in FIG. 2, the client application 128 may also include a data storage 238. The data storage 238 can store and maintain rule data 242 representative of segment queries, dimension item value definitions, and query results as described above. For example, a user may select a previously configured segment query stored as rule data 242, and submit the previously configured segment query to the analytics engine 104 with new definitions for the dimension item values included in the segment query. Thus, the user may utilize a stored query to identify new query results.

Figure 3A:
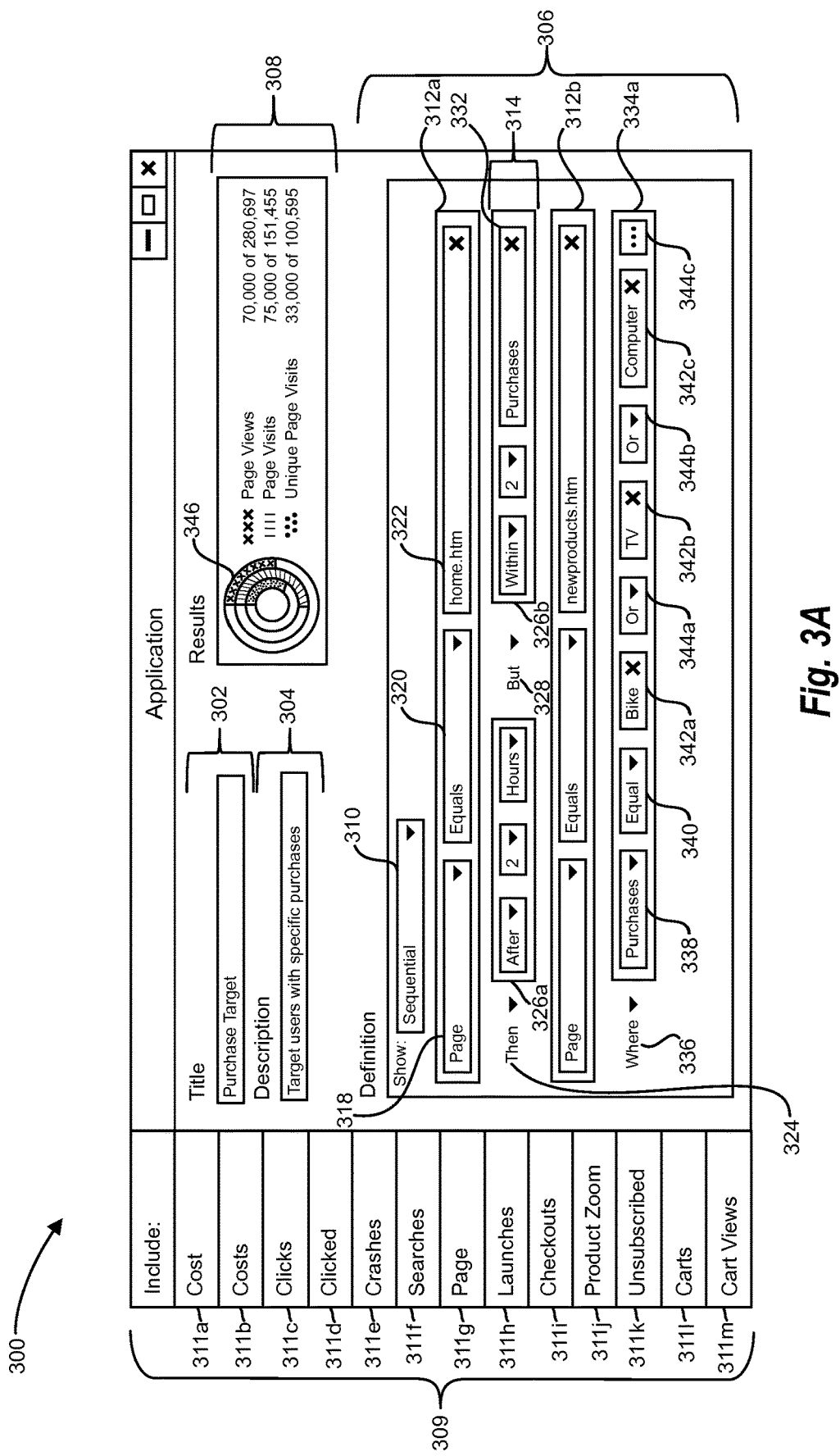
FIG. 3A illustrates a view of a segment generation user interface in accordance with one or more embodiments.

As described above, the segment builder 202 may provide segment query building controls to the client application 128 in order to assist a user in building a segment query. This process will now be described in greater detail with reference to FIGS. 3A-3C. For example, FIG. 3A illustrates a segment query building GUI 300. The segment query building GUI 300 can include one or more of the features disclosed by U.S. Pat. No. 8,135,722, the entire contents of which are hereby incorporated by reference. As shown in FIG. 3A, the segment query building GUI 300 can include, but is not limited to, a title field 302, a description field 304, a segment canvas 306, and a results summary display 308. In one or more embodiments, each of the features 302-308 can be provided by the segment builder 202 of the analytics engine 104 and may include one or more interactive input controls and/or segment query building controls In one or more embodiments, the title field 302 can include the label, "Title," as well as a text input box. In one embodiment, a user may input a title for the segment query that is being built into the text input box of the title field 302. In additional or alternative embodiments, the title field 302 may include other input controls such as check boxes, radio buttons, etc.

As mentioned above, in some embodiments, when the user submits a completed segment query to the analytics engine 104 for processing, the analytics engine 104 may store the segment query in the segment query data 226 for future use. In that case, the data storage 218 may store the submitted segment query according to the title provided by the user in the text input box of the title field 302. Similarly, in one or more embodiments, the client application 128 may store rule data 242 associated with the segment query illustrated in FIG. 3A according to the title provided by the user in the text input box of the title field 302. Thus, in one or more embodiments, a user may retrieve the segment query illustrated in FIG. 3 from the rule data 242 and/or the segment query data 226 in order to edit and/or process the segment query at a future time Also as illustrated in FIG. 3A, segment query building GUI 300 can include a description field 304. In one or more embodiments, the description field 304 can include a label, "Description," as well as a text input box. A user may input a description for the segment query in the text input box of the description field 304. For example, the description may be a general overview of the segment of users the segment query is directed toward. Additionally, or alternatively, the description field 304 may include other controls in order for a user to specify a type associated with the segment query, or additional information related to the segment query. Furthermore, if the client application 128 and/or the analytics engine 104 stores the segment query associated with the description field 304 (i.e., as rule data 242 and/or segment query data 226), the description entered into the description field 304 may be included as data associated with the segment query.

In some embodiments, the analytics engine 104 may utilize the description entered into the description field 304 when attempting to retrieve a stored segment query from data storage 218. For example, a user may wish to run a segment query that was previously built and stored in either the data storage 238 of the client application or the data storage 218 of the analytics engine 104. However, the user may not remember the title for the desired segment query, and accordingly must search for it. In one embodiment, the user may enter search terms into a search box (not shown), and prompt the client application 128 and/or the analytics engine 104 to search for stored segment queries responding to the entered search terms in the segment query data 226. In that case, the client application 128 and/or the analytics engine 104 can search through the segment query descriptions that are associated with the stored segment query data 226 in order to find segment queries that respond to the search terms.

As mentioned above, the segment query building GUI 300 can include a segment canvas 306 or query building canvas 306. As shown in FIG. 3A, a user can input various segment-query building controls 310 and 318-342 within the segment canvas 306. As described above, the segment builder 202 may provide each of the segment-query building controls 310 and 318-342 in response to detected user input so as to guide and assist the user in building a segment query. For example, when the user initially accesses the client application 128 in order to build a segment query, the segment canvas 306 of the segment query building GUI 300 may be mostly or entirely empty.

For example, the segment builder 202 may initially provide only a type drop down list 310 within the segment canvas 306. In one or more embodiments, the type drop down list 310 can include a list of possible segment query types. The list of possible segment query types may include, but are not limited to, a "sequential" segment query type, or a "frequency" segment query type. In one or more embodiments, the type of a segment query may generally refer to the type of segment query that will be included in the segment canvas 206. Although only three types of segment query are described herein, the embodiments described herein are not so limited. In alternative embodiments, the segment query building GUI 300 can populate with segment query building controls for a wide ranges of other types of segments as well.

In response to the user selecting the segment query type "sequential" in the type drop down list 310 (or dragging or dropping a type control into the segment canvas 306), segment query building GUI 300 can populate with additional segment query building controls to guide the user in building a segment query of this type. As discussed above, an event is an action taken by a user that is tracked by the analytics engine 104. Accordingly, segment query building GUI 300 can provide the event control 312a such that the user may define a specific event that should be included in the segment query.

Additionally or alternatively, the segment query building GUI 300 can also provide the event list 309. In one or more embodiments, the analytics engine 104 can provide the event list 309 along with the title field 302, the description field 304, the segment canvas 306, and the results summary display 308. For example, in one embodiment, the event list 309 includes one or more selectable drag-and-drop event options 311a-311m. In one or more embodiments, a user can build a segment query by dragging and dropping one or more selectable drag-and-drop event options 311a-311m into the segment canvas 306. For instance, in response to a user dragging and dropping one or more selectable drag-and-drop event options 311a-311m into the segment canvas 306, the segment builder 202 can provide sub-elements related to the event option 311a-311m.

As shown in FIG. 3A, the event list 309 can include a predetermined number of selectable drag-and-drop event options. In one or more alternative embodiments, the event list 309 is scrollable and includes more selectable drag-and-drop event options than are shown in FIG. 3A. Additionally, in one embodiment, the segment builder 202 can provide the selectable drag-and-drop event options 311a-311m in response to the user selecting the segment query type "sequential" in the type drop down list 310.

In response to the user dragging and dropping the selectable drag-and-drop event option 311g into the segment canvas 306, the segment query building GUI 300 can provide the event control 312a. As illustrated in FIG. 3A, the event control 312a can include an event type drop down list 318, an operator type drop down list 320, and an event specification text box 322. In one or more embodiments, if the segment builder 202 did not add the event control 312a to the segment canvas 306 in response to a user drag-and-drop or if the user wishes to change the event type of the event control 312a, the user may define a specific event for inclusion in a segment query via the input controls 318-322. For example, in one embodiment, the segment query building GUI 300 can populate the event type drop down list 318 with a list of possible types of events that a user may perform. Possible events can include, but are not limited to, "page" (i.e., a page landing), "download" (e.g., a user downloads a file), "upload" (e.g., the user uploads a file), "transaction" (e.g., a purchase button click, a instant message send, a search query submit, etc.), and so forth.

In response to the user selecting an event type in the event type drop down list 318, the segment query building GUI 300 may provide additional segment query building controls within the event control 312. For example, as shown in FIG. 3A, the segment query building GUI 300 may also provide an operator type dropdown box 320 and an event specification textbox or drop down 322. In one or more embodiments, in order for the event control 312 to add meaning to the overall segment query, the user can provide a definition for the event type selected in the event type drop down list 318. Accordingly, in one embodiment, the user may select an operator from a list of operators in the operator type drop down list 320.

The list of operators in the operator type drop down list 320 can include various operators that specify a relationship between the event type drop down list 318 and the event specification text box 322. In one or more embodiments, the list of operators in the operator type drop down list 320 can include, but are not limited to, "equals," "is not," "is at least," "is part of," "includes," etc. In one embodiment, the segment query building GUI 300 may provide another input control in place of the event specification text box 322 in response to the operator selected by the user. Thus, the segment query building GUI 300 can provide various combinations of controls within the event control 312a based on the user's selections.

As shown in FIG. 3A, however, in response to the user selecting the event type "page" in the event type drop down list 318, and the operator "equals" in the operator type drop down list 320, the segment query building GUI 300 can provide the event specification text box or drop down 322. In one or more embodiments, the user may specify an event in the event specification text box 322 that is of the same event type as what is specified in the event type drop down list 318. For example, as illustrated in FIG. 3A, the user may enter the website "home.htm" in the event specification text box 322. Thus, the portion of the segment query being built within the event control 312 specifies that the segment of users identified by the segment query will have landed on the webpage, "home.htm." In one or more embodiments, the segment builder 202 may provide error checking for any value entered into the event specification text box 322, such that an incorrect value may not be entered (i.e., if the event type is "page," the value entered into the event specification text box 322 may be a string of characters followed by ".htm," ".html," etc.).

Once the segment builder 202 detects the event control 312 is completed (i.e., the user has supplied the necessary information), the segment query building GUI 300 may provide further segment query building controls within the segment canvas 306. For example, following the completion of the event control 312a, the segment query building GUI 300 may then provide a sequence control 314. In one or more embodiments, the sequence control 314 allows the user to specify a sequence. For example, once the segment builder 202 detects the event control 312a is complete, the segment builder 202 may provide a sequence operator drop down list 324, defaulted to a null character (i.e., "—").

In one embodiment, if the user were to submit a segment query including only the information specified in the event control 312a, the analytics engine 104 would return a segment of users from the analytics database 108 that, at some point, landed on the webpage, "home.htm." In order to further narrow the segment query, in one or more embodiments, the user may select a sequential operator from the sequence operator drop down list 324. Sequential operators may include, but are not limited to, "then," "while," "after," "then immediately," etc. In one or more embodiments, the sequential operator specified via the sequence operator drop down list 324 indicates to the segment query building GUI 300 what further segment query building controls to provide within the segment canvas 306. Accordingly, in one embodiment, the "then" sequential operator, as shown in FIG. 3A, may cause the segment query building GUI 300 to provide a second event control 312b, wherein a user may specify a second event, as described above. In one or more embodiments, the segment query building GUI 300 may provide as many controls as requested by the user in order for the user to build a segment query directed to virtually any sequence of events.

If the user submits a segment query based only on the event controls 312a and 312b, and the sequential operator "then" selected in the sequence operator drop down list 324, the resulting segment query can cause the analytics engine 104 to identify users who landed on the webpage "home.htm," then landed on the webpage "newproducts.htm." Users identified in response to such a query may have visited other websites in between landing on "home.htm" and "newproducts.htm", or may have not event visited "home.htm" and newproducts.htm" on the same day. Accordingly, the user who is building the segment query may desire to add a condition to the query in order to further narrow the query results.

In one or more embodiments, the segment query building GUI 300 may provide additional segment query building controls within the sequential control 314 in order for the user to add one or more conditions to the specified sequence. For example, as illustrated in FIG. 3A, the segment builder 202 may provide the controls 326a, 326b and 328 in order for the user to place a condition on the sequential control 314. In one embodiment, the segment query building GUI 300 can provide the sequence condition control 326a first, and then provide the controls 326b and 328 depending on the user's input related to the sequence condition control 326a.

The segment query building GUI 300 can provide the sequence condition controls 326a, 326b in order for the user to define specific conditions to include in the finished segment query. For example, as shown in FIG. 3A, the segment builder 202 may provide various drop-down lists within each sequence condition control 326a, 326b such that the user may specifically define the conditions "after 2 hours" and "within 2 purchases." In additional or alternative embodiments, the segment query building GUI 300 can provide various controls within the sequence condition control 326a, 326b such that the user may define virtually any sequence condition.

Also as illustrated in FIG. 3A, the segment query building GUI 300 may provide a sequence condition operator drop down list 328 in order for the user to concatenate two or more conditions together. For example, sequence condition operator drop down list 328 can include a list of sequential condition operators including, but not limited to, "but," "and," "but not," etc. Accordingly, a segment query as defined by the event controls 312a and 312b, and the sequential control 314, as shown in FIG. 3A, can cause the analytics engine 104 to identify a segment of users in the analytics database 108 who visited "home.htm" then after two hours but within two purchases visited "newproducts.htm."

In yet another embodiment, the segment query building GUI 300 may provide segment query building controls that allow a user to even further narrow the segment query. For example, in one embodiment, the segment query building GUI 300 may allow for the use of unique dimension item values. As described above, a unique dimension item value is a type of user-defined variable. For example, as shown in FIG. 3A, the segment query building GUI 300 may provide a dimension item value control 332. In one or more embodiments, the user may indicate a dimension item value within the dimension item value control 332. The dimension item value may be any item of a type or category of information tracked within the analytics database 108. Accordingly, when the dimension item value within the dimension item value control 332 is not provided, the dimension item value may refer to any piece of information matching that type or category (i.e., any type of purchase would satisfy the condition "within 2 purchases").

In one or more embodiments, the analytics engine 104 can allow a user to define a dimension item value. For example, as shown in FIG. 3A, the segment query building GUI 300 may provide a segment canvas 334a. The segment query building GUI 300 may provide various segment query-building controls within the segment canvas 334a in order for a user to specify a specific dimension item value. For instance, within the segment canvas 334a, the segment query building GUI 300 may provide a definition type dropdown 336, a dimension item value dropdown 338, a definition operator drop down list 340, definition value text boxes 342a, 342b, and 342c, and definition value operator drop downs 344a, 344b, and 344c. In additional or alternative embodiments, the segment query building GUI 300 may provide a segment canvas 334a for each dimension item value utilized within the segment canvas 306.

In one or more embodiments, the user may indicate a definition type by selecting an option in the definition type drop down list 336. The definition type drop down list 336 may include definition types including, but not limited to, "where," "where not," "including at least," etc. Thus, depending on the type of definition, a user may define a dimension item value in a variety of ways. Accordingly, in response to a user selection of a definition type "where," the segment builder 202 may first provide the dimension item value drop down list 338, such that the user may select the dimension item value to which the definition within the segment canvas 334a applies (e.g., the user may select "purchases," as shown).

Next, the segment query building GUI 300 may provide the definition operator drop down list 340. The definition operator drop down list 340 can be similar in function to the operator type drop down list 320, in that a value selected therein indicates a relationship between the dimension item value drop down list 338 and the definition value text box 342a. Additionally, the user may expand the relationship between the dimension item value drop down list 338 and the definition value text box 342a to include other definition value text boxes 342b and 342c. The user may indicate a relationship between these additional definition value text boxes 342b and 342c by utilizing the definition value operator drop down lists 344a and 344b. As with the operator drop down lists described above, the definition value operator drop down lists 344a and 344b may include operators including, but not limited to, "or," "and," "not," etc. In one embodiment, the segment query building GUI 300 may provide further definition value text boxes and/or definition value operators in response to the user selecting the definition value operator drop down list 344c.

Accordingly upon submission to the analytics engine 104, the full segment query built by the user as illustrated in FIG. 3A would cause the analytics engine 104 to identify users in the analytics database 108 who visited "home.htm," then after two hours but within two purchases where the purchases are of a bike, a TV, or a computer, visited "newproducts.htm." As such, the user has created a specific segment query with a high level of granularity. Once the user has built the segment query, the client application 128 may store the segment query in the data storage 238 for later processing. Additionally or alternatively, the client application 128 may send the segment query to the analytics engine 104 for processing.

Thus, the embodiment illustrated in FIG. 3A shows an embodiment including advanced sequential segmentation that includes sequence conditions based on user-defined dimension item values (i.e., "within 2 purchases of a bike, a TV, or a computer). One will appreciate in light of the disclosure herein that this allow a marketer to more fully explore and capture a specific, granular segment.

In alternative embodiments, the analytics engine can allow the marketer to further tailor the segment. Specifically, rather than having multiple dimension item values, the sequence condition can be defined by a single dimension item value. For example, the two purchases can be defined by a single dimension item value (e.g., a purchase of a bike) rather than three dimension item values.

Still further, the analytics engine can allow for a single sequence condition rather than two sequence conditions. For example, rather than having an after/within combination of sequence conditions as shown by FIG. 3A, the analytics engine can include a single sequence condition (e.g., then) defined by one or more dimension item values. Alternatively, when using nested, linear, or otherwise more complex sequence conditions (such as after/within clauses) each sequence condition can be defined by one or more specific dimension item values.

In any event, upon receiving a sequence query, the analytic engine 104 can process the query. In particular, the analytics engine 104 may process a segment query as it is being built. For example, as described above, a user may begin the process of building the segment query illustrated in FIG. 3A by dragging and dropping the selectable drag-and-drop event option 311g into the segment canvas 306. In one or more embodiments, in response to that drag-and-drop event, the analytics engine 104 may process a segment query that returns search results for all users in the analytics database 108 who visited the webpage "home.htm." The analytics engine 104 would then further narrow and alter the search results as the user adds more selectable drag-and-drop event options and/or control configurations to the controls defined in the segment canvas 306.

In one or more embodiments, the analytics engine 104 may process the segment query, as described above, and provide query results to the client application 128. For example, as shown in FIG. 3A and as mentioned above, the segment query building GUI 300 may include a results summary display 308. In an embodiment, the client application 128 may display query results provided by the analytics engine 104 within the results summary display 308. The client application 128 can display query results in a variety of different ways. For example, the results summary display 308 can include textual and graphical elements that communicate the results to the user.

As shown in FIG. 3A, the results summary display 308 can include broad results. For example, for the "page views" category of user information, the results in the results summary display 308 communicate to the user that of 280,697 total page views, 70,000 page views are associated with information that matches the dimensions of the segment query defined in the segment canvas 306. Similarly, the results in the results summary display 308 communicate that of 151,455 total visits, 75,000 of those visits are associated with information that matches the dimensions of the segment query defined in the segment canvas 306. Furthermore, the results in the results summary display 308 communicate that of 100,595 unique visits, 33,000 of those unique visits are associated with information that matches the dimensions of the segment query defined in the segment canvas 306.

In addition, the results summary display 308 may communicate query results graphically, such as with a results graphic 346, that communicates the same results information in a non-textual manner. Furthermore, in some embodiments, the user interface manager 230 may provide specific data points in response to a detected selection of any member within the results summary display 308. For example, the user interface manager 230 may provide more granular user data in response to a detected mouse-hover over the results graphic 346. In additional or alternative embodiments, the user interface manager 230 may also provide full data lists on a separate GUI in response to a user clicking on a link within the results summary display 308.

As discussed above, the segment query building GUI 300 can provide various segment query building controls depending on the type of segment query that a user is building. For example, as shown in FIG. 3B, the segment query building GUI 300 may provide one or more controls that allow a user to build a segment query utilizing dimension item variables.

Figure 3B:
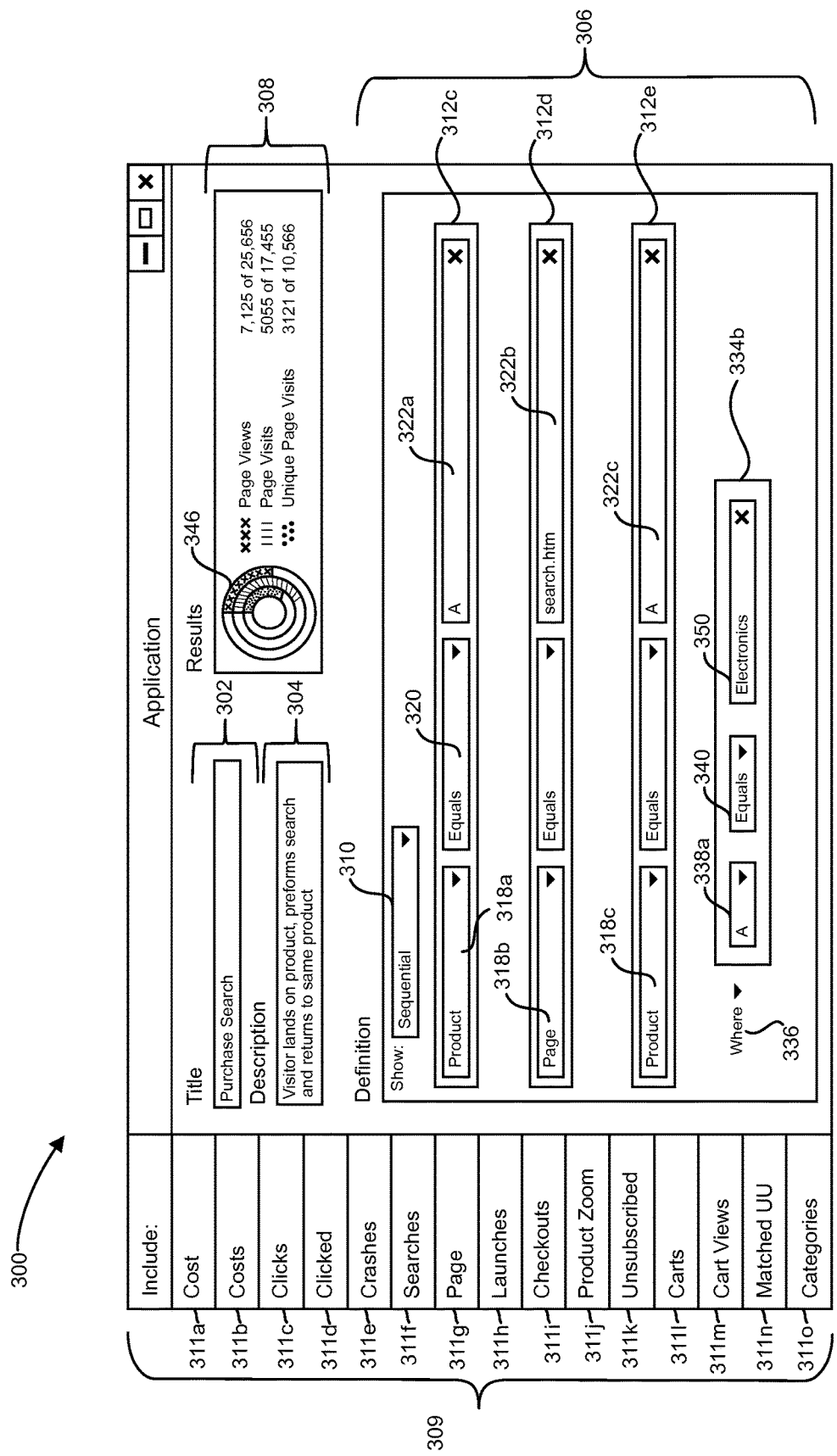
FIG. 3B illustrates another view of the segment generation user interface in accordance with one or more embodiments.

As illustrated in FIG. 3B and as discussed above, the segment query building GUI 300 may include the title field 302, the description field 304, the segment canvas 306, and the results summary display 308. As described above, the segment query building GUI 300 may provide various segment query-building controls. For example, the segment query building GUI 300 can provide event controls 312c, 312d, and 312e, which the user can input into the segment canvas 306. In one or more embodiments, the analytics engine 104 can process the query defined by the event controls 312c, 312d, and 312e in order (i.e., search for users who satisfy the condition defined by event control 312c, then 312d, then 312e) even though there is no sequential operator dropdown list 324 included in the definition (as in FIG. 3A).

Alternatively, the segment query building GUI 300 may provide various controls in response to a drag-and-drop event. For example, as described above, the segment query building GUI 300 can provide the event controls 312c-312e in response to the user dragging and dropping one or more of the selectable drag-and-drop event options 311a-311o from the event list 309 into the segment canvas 306. In one or more embodiments, as the user drags and drops the one or more selectable drag-and drop even options into the segment canvas 306, the rule manager 206 can run error and syntax checks to ensure the controls provided within the segment canvas 306 can be used in building a segment query that can be processed by the analytics engine 104 without causing a run-time error.

Additionally, as mentioned above, the segment builder 202 may allow for the use of dimension item variables. As used herein, a dimension item variable is a placeholder character that can be defined in multiple ways. For example, as illustrated in FIG. 3B, the event control 312c can include the event type dropdown list 318a, the operator type dropdown list 320, and the event specification text box 322a, wherein the user has specified the dimension item variable "A." As described above, the user has specified a "product" event type within the event type dropdown list 318a, and "equals" in the operator type dropdown list (i.e., the event is satisfied when the user views a webpage including a product). Until the user gives a definition to the dimension item variable specified in the event specification textbox 322a, however, the analytics engine 104 will query the analytics database 108 for all users who viewed a webpage including any product.

As such, in one embodiment, a segment rule defined by the event controls 312c, 312d, and 312e will cause the analytics engine 104 to query the analytics database 108 for a segment of users who viewed any webpage including any product, then visited the webpage "search.htm" (i.e., as specified by the event type dropdown list 318b and the event specification textbox 322b), then viewed any webpage including any product (i.e., as specified by the event type dropdown list 318c and the event specification textbox 322c including the dimension item variable "A"). In one or more embodiments, it is likely that the segment returned by the analytics engine 104 in response to such a segment rule would be so large that it would not be of much value to the user. Accordingly, in order to further narrow the segment rule without changing the segment rule, the user may add a definition to the dimension item variable "A."

In one or more embodiments, the user can add a definition to a dimension item variable by selecting "where" in the definition type dropdown list 336 and including the segment canvas 334b in the segment canvas 306. As shown in FIG. 3B, the segment builder 202 can provide a dimension item value dropdown list 338a, a definition operator dropdown list 340 and a definition specification textbox 350 within the segment canvas 334b. In one or more embodiments, the user may utilize these controls to define the dimension item variable "A."

In one or more embodiments, the analytics engine 104 can process dimension item variables that are defined in various ways. For example, in one embodiment, a user can utilize the segment canvas 334b to define the dimension item variable to include a single dimension item (i.e., a "bike"). In another embodiment, a user can utilize the segment canvas 334b to define the dimension item variable to include a dimension item type (i.e., "electronics," as shown in FIG. 3B). In that case, a dimension item type can include all objects that fall under the definition of that type. Accordingly, in one embodiment, the segment rule defined by the segment canvas 306, as shown in FIG. 3B, would cause the analytics engine 104 to query the analytics database 108 for a segment of users who viewed any webpage including any type of electronics, then visited the webpage "search.htm," then viewed any webpage including any type of electronics. The analytics engine 104 may provide the results of this segment query via the results summary display 308 and results graphic 346, as described above.

As shown by FIG. 3B, the analytics engine 104 can provide for advanced sequential segmentation that allows for segments with sequential events based on user-defined dimension variables. As shown, query in the segment query building GUI 300 of FIG. 3B includes an initial event (product="A") and a subsequent event (product="A"). The segment-query building graphical-user-interface can further allow the marketer to define the initial and subsequent events by the same dimension item variable ("A"). Based on the segment query, the analytics engine can query an analytics database for a segment of users who performed the initial event defined by the dimension item variable ("A") and then performed the subsequent event defined by the same dimension item variable ("A").

FIG. 3B further shows that the analytics engine 104 can allow the marketer to further tailor the segment with sequence conditions. For instance, the segment query can include users who visit a first product webpage, then perform a search (sequence condition), and then returns to the first product webpage. While FIG. 3B shows a single sequence condition, in alternative embodiments a marketer can include more than one sequence condition as described above in relation to FIG. 3A. In particular, the segment query can include nested, linear, and other complex sequence conditions. Furthermore, the analytics engine 104 can allow any such sequence conditions to be defined by one or more specific dimension item values as described above in relation to FIG. 3A.

Sequential segment queries and queries including dimension item variables are discussed with reference to FIGS. 3A and 3B. However, as mentioned above, the segment query building GUI 300 may also provide segment query building controls for segment queries directed to the frequency or regularity of events. For example, a segment query that causes the analytics engine 104 to identify users who perform repeated events, at a given regularity or frequency. In order to determine a segment of users based on a frequency rule, the analytics engine 104 can identify users within the analytics database 108 who have performed one or more given events within the frequency rule at the rate or frequency defined by the frequency rule. Accordingly, as shown in FIG. 3C, the segment query building GUI 300 may provide segment query building controls that are specific to that type of segment query.

Figure 3C:
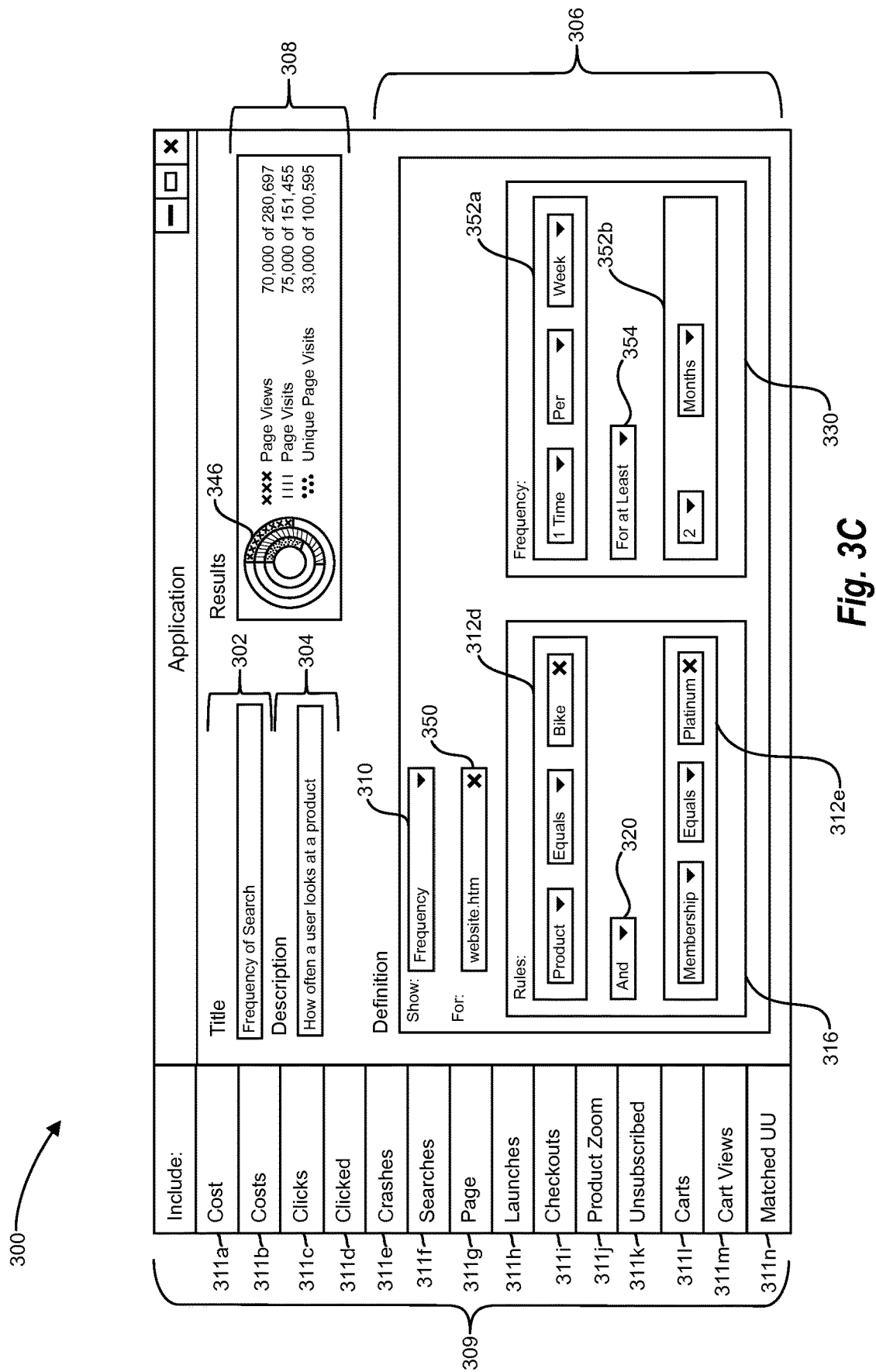
FIG. 3C illustrates yet another view of the segment generation user interface in accordance with one or more embodiments.

As illustrated in FIG. 3C and as discussed above, the segment query building GUI 300 may include the title field 302, the description field 304, the segment canvas 306, and the results summary display 308. In one or more embodiments, in response to a user selecting the segment type "frequency" from the type drop down list 310, the segment query building GUI 300 may provide various segment query-building controls that a marketer can move into the segment canvas 306. Specifically, in response to the user selecting the segment type "frequency" from the type drop down list 310, the segment query building GUI 300 may provide the selectable drag-and-drop event options 311a-311n in the event list 309, as shown in FIG. 3C. Additionally, the segment query building GUI 300 may also provide a definition specification text box 350, wherein the user may specify a group of files (i.e., a website, a file share, an application) to which the analytic engine 104 may apply the segment definition. In one or more embodiments, the segment query building GUI 300 may provide the definition specification text box 350 as part of other GUIs (i.e., as illustrated in FIGS. 3A and 3B).

In one or more embodiments, in response to the user selecting the segment type "frequency" from the type drop down list 310, the segment query building GUI 300 may provide a rule control 316 and frequency threshold segment canvas 330 within the segment canvas 306. For example, the rule control 316 may include one or more event control 312d, 312e concatenated by one or more operator type drop down list(s) 320. Utilizing these controls, the user may specify a group of events, or other conditions, that to be true in order for the rule to be true. For example, as shown in FIG. 3C, in order for the analytic engine 104 to identify a user from the analytics database 108, the user will have looked at webpages including "bike," and have a platinum level membership to "website.htm."

In addition to a rule, a frequency-type segment query generally also includes a frequency definition. Accordingly, as shown in FIG. 3C, the segment query building GUI 300 may also provide the frequency threshold segment canvas 330. In one or more embodiments, a frequency-type segment query is processed by the analytics engine 104 such that the analytics engine 104 identifies one or more users whose have been tracked performing certain events with a certain frequency or regularity. The analytics engine 104 may determine frequency or regularity of user events by identifying time stamps associated with each event tracked and stored within the analytics database 108.

In one or more embodiments, the frequency threshold segment canvas 330 may include one or more frequency threshold controls 352a, 352b concatenated by one or more frequency threshold operator drop down list(s) 354. By utilizing these controls, the user may specify the level of frequency with which the rule defined in the rule control 316 should be applied by the analytics engine 104. For example, in response to submitting the segment query illustrated in FIG. 3C, the analytics engine 104 can identify users from the analytics database 108 who have a platinum membership to "website.htm," and who have looked at the product "bike" once a week for at least the last two months. In additional or alternative embodiments, the segment query building GUI 300 may provide any combination of input controls within the frequency threshold segment canvas 330 in order for a user to define a very specific frequency threshold definition. Also as discussed above, the client application 128 may provide the results of this query within the results summary display 308.

Thus, the analytics engine 104 can provide for advanced sequential segmentation that includes segments defined by repeated events performed at given regularity or frequency. For example, rather than just being able to query and return segments defined by a sequence of single events, the analytics engine can provide for segments that indicate users who perform one or more given events repeatedly over a given time period. Furthermore, the analytics engine can allow for segments based on regularity or frequency based on user-defined dimension variables.

Figure 4:
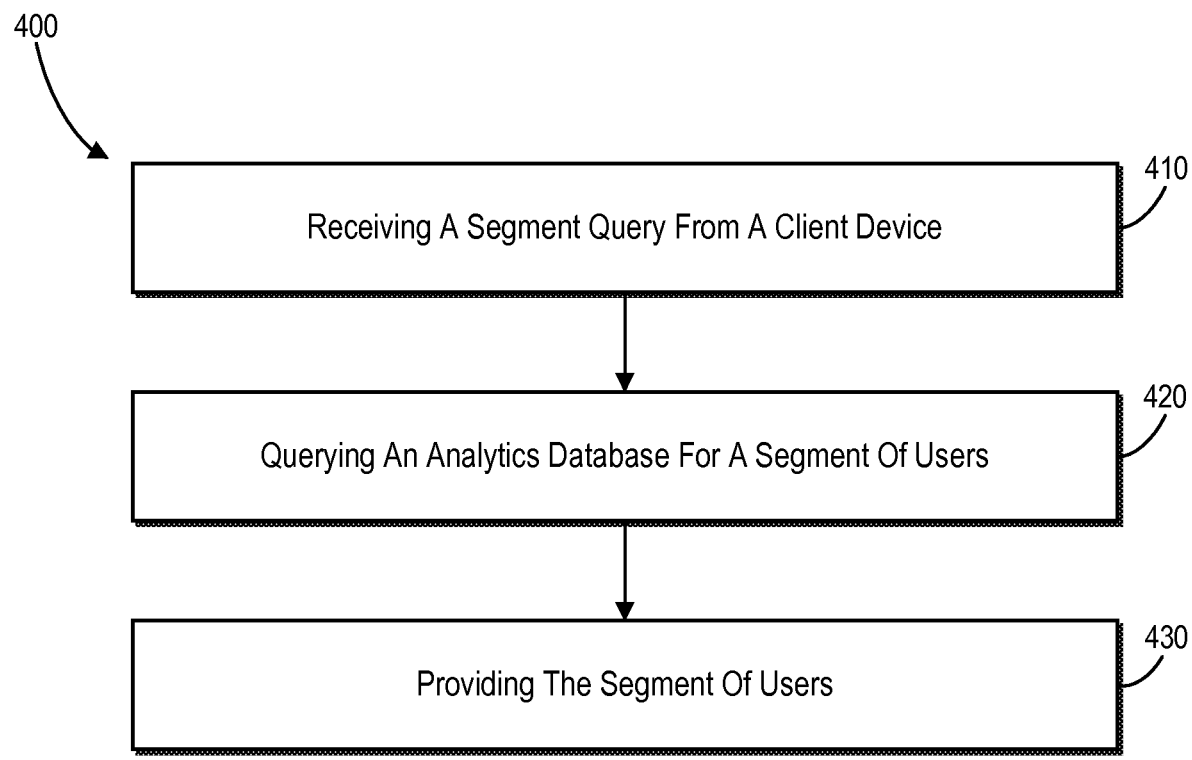
FIG. 4 illustrates a flowchart of a series of acts in a method of identifying a segment of users in accordance with one or more embodiments.
Figure 5:
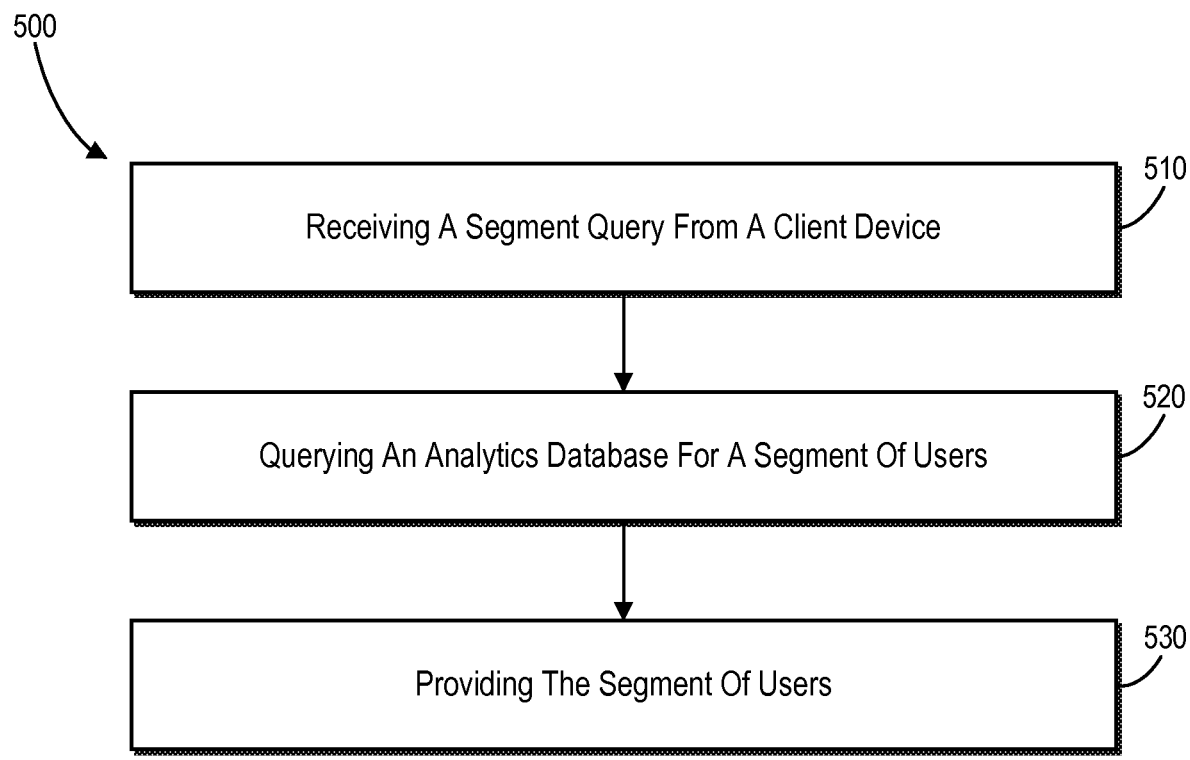
FIG. 5 illustrates a flowchart of a series of acts in another method of identifying a segment of users in accordance with one or more embodiments.
Figure 6:
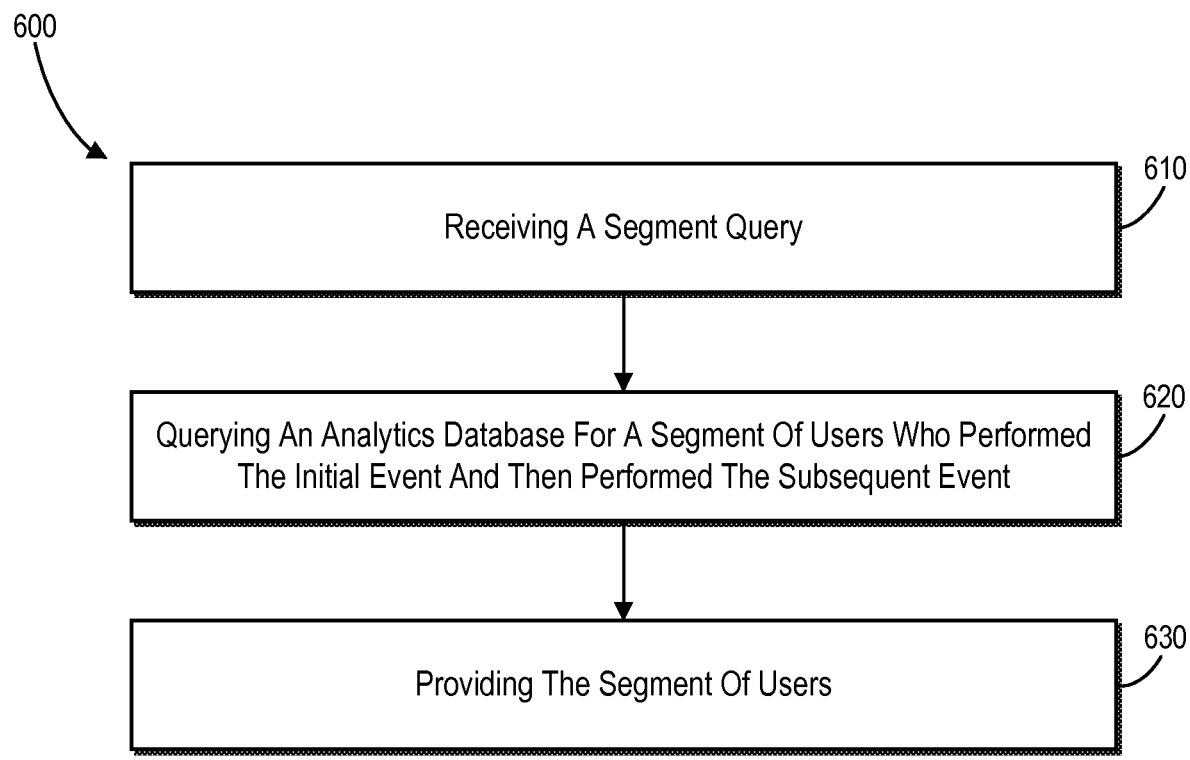
FIG. 6 illustrates a flowchart of a series of acts in yet another method of identifying a segment of users in accordance with one or more embodiments.

Specifically, the analytics engine 104 can provide a segment-query building graphical-user-interface 300 that allows a marketer to build a segment query including a segment rule 312 d/312e and a frequency threshold 352a. The segment-query building graphical-user-interface can further allow the marketer to define the frequency threshold as a number of times the segment rule is satisfied. Based on the segment query, the analytics engine can query an analytics database for a segment of users who satisfy the segment rule within the frequency threshold. One specific example of the foregoing embodiment includes a segment defined by users who visit a BMX bike product webpage (a segment rule) at least once a week for at least two weeks. Rather than specifying a dimension item value, the analytics engine can allow the marketer to use a dimension item variable as discussed above FIGS. 1-3C, the corresponding text, and the examples, provide a number of different systems and devices for identifying segments of network users. In addition to the foregoing, embodiments of the present invention can also be described in terms of flowcharts comprising acts and steps in a method for accomplishing a particular result. For example, FIGS. 4-6 illustrate flowcharts of exemplary methods in accordance with one or more embodiments of the present invention. The methods described in relation to FIGS. 4-6 may be performed with less or more steps/acts or the steps/acts may be performed in differing orders. Additionally, the steps/acts described herein may be repeated or performed in parallel with one another or in parallel with different instances of the same or similar steps/act.

FIG. 4 illustrates a flowchart of one example method 400 of identifying segments of network users. The method 400 includes an act 410 of receiving a segment query from a client device. In particular, the act 410 can involve receiving a segment query from a client device that includes an indication of a first event and a second event (i.e., event controls 312*a*, 312*b* of FIG. 3A), and a sequence condition defined by one or more specific dimension item values (i.e., sequence condition control 326*a* of FIG. 3A, and dimension item value 332 within sequence condition control 326*b* of FIG. 3A). For example, in one or more embodiments, the sequence condition comprises one of: a number of purchases, a number of pages visited, a number of in-application purchases, a number of searches, or a number of advertisements engages. Additionally, in one or more embodiments, the one or more specific dimension item values include one of: one or more specific products purchased, one or more specific pages visited, one or more specific applications from which the in-application purchases were made, one or more specific search queries, one or more specific advertisements engaged, or a campaign of advertisements.

Also, in one or more embodiments, the one or more specific dimension item values include a plurality of dimension item values. Additionally, in one embodiment, the one or more specific dimension item values include a variable. For example, the variable can include one or more of a value, a regular expression, or an array of possible values. Furthermore, in another embodiment, the indication of a first event and the indication of the second event specify actions performed by a user. For instance, actions performed by the user can include one or more of requesting a webpage, downloading data, uploading data, instantiating an application, or submitting a transaction.

The method 400 can also include an act 420 of querying an analytics database 108 for a segment of users. In particular, the act 420 can involve querying an analytics database 108 for a segment of users who performed the first event followed by the second event in accordance with the sequence condition defined by the one or more specific dimension item values. In one or more embodiments, the segment query further includes an additional sequence condition, and querying the analytics database 108 can include querying the analytics database 108 for a segment of users who performed the first event followed by the second event in accordance with the sequence condition defined by the one or more specific dimension item values and the additional sequence condition. In that case, for example, the additional sequence condition can include one or more additional specific dimension item values. Alternatively, the additional sequence condition can include a time-based sequence condition.

The method 400 can further include an act 430 of providing the segment of users. In particular, the act 430 can involve providing the segment of users to the client device (i.e., via the results summary display 308 in FIGS. 3A, 3B, and 3C). In one or more embodiments, providing the segment of users to the client device can further include providing additional information associated with the segment of users.

Furthermore, the method 400 can include an act of providing, prior to receiving the segment query and to the client device, a graphical user interface including one or more segment query building controls (i.e., as within the segment canvas 306 illustrated in FIGS. 3A, 3B, and 3C). For example, in one or more embodiments, receiving the segment query from the client device includes receiving an indication of one or more segment query building controls entered into the graphical user interface. Additionally, in one or more embodiments, the method 400 can include receiving an input via one of the one or more segment query building controls that partially defines the segment query, and based on the input received via the segment query building control, providing to the client device, an update indicating results of the partially defined segment query.

FIG. 5 illustrates a flowchart of another example method 500 of identifying segments of network users. The method 500 can include an act 510 of receiving a segment query from a client device. In particular, the act 510 can involve receiving, from a client device, a segment query including a segment rule (i.e., via the rule control 316 of FIG. 3C), and a frequency threshold (i.e., via the frequency segment canvas 330 of FIG. 3C). In one or more embodiments, the frequency threshold includes a number of times a segment rule is satisfied. In one embodiment, the segment rule includes an event defined by a dimension item variable, and the frequency threshold is defined by the number of times the segment rule is satisfied within a predetermined period of time.

Furthermore, the method 500 can include an act 520 of querying an analytics database 108 for a segment of users. In particular, the act 520 can include querying an analytics database 108 for a segment of users who satisfy the segment rule within the frequency threshold. For example, in one or more embodiments, the method 500 can include an act of providing analytical information from the analytics database associated with the segment of users. In one embodiment, the analytical information from the analytics database associated with the segment of users includes one or more of events performed by each of the segment of users, a timestamp associated with each of the one or more events performed by each of the segment of users, tracking data associated with each of the segment of users, demographic data associated with each of the segment of users, or transaction data associated with each of the segment of users.

Additionally, the method 500 can include an act 530 of providing the segment of users. In particular, the act 530 can involve providing the segment of users to the client device (i.e., via the results summary display 308 in FIGS. 3A, 3B, and 3C). In one or more embodiments, providing the segment of users to the client device may also include providing a graphical representation of the analytical information from the analytics database associated with the segment of users.

FIG. 6 illustrates a flowchart of another example method 600 of identifying segments of network users. The method 600 can include an act 610 of receiving a segment query. In particular, the act 610 can involve receiving, from a client device, a segment query. In one or more embodiment, the segment query can include an indication of an initial event defined by a dimension item variable, and an indication of a subsequent event defined by the dimension item variable (i.e., as in event controls 312*c* and 312*e* of FIG. 3B). For example, in one embodiment, the dimension item variable includes one or more of a single item variable, an item type variable, or a plurality of item variables or item type variables.

The method 600 can further include an act 620 of querying an analytics database 108 for a segment of users who performed the initial event and then performed the subsequent event. In particular, the act 620 can involve querying an analytics database 108 for a segment of users who performed the initial event defined by the dimension item variable and then performed the subsequent event defined by the dimension item variable. In one or more embodiments, querying an analytics database 108 for the segment of users who performed the initial event defined by the dimension item variable, then performed the subsequent event as defined by the dimension item variable includes returning a segment of users who performed the initial event defined by a specific dimension item and then performed the subsequent event defined by the same specific dimension item, the specific dimension item being any item of the dimension. In one embodiment, the segment query further includes a sequence condition. In that case, querying the analytics database can include querying the analytics database for a segment of users who performed the initial event defined by the dimension item variable followed by the subsequent event defined by the dimension item variable in accordance with the sequence condition.

Furthermore, the method 600 can include an act 630 of providing the segment of users. In particular, the act 630 can involve providing the segment of users to the client device (i.e., via the results summary display 308 in FIGS. 3A, 3B, and 3C). Additionally, in one or more embodiments, providing the segment of users to the client device can further include providing additional information associated with the segment of users to the client device.

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory, etc.), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed at a processor, cause a general purpose computer, special purpose computer, or special purpose processing device to perform a certain function or group of functions. In some embodiments, computer-executable instructions are executed on a general-purpose computer to turn the general-purpose computer into a special purpose computer implementing elements of the disclosure. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. In this description, "cloud computing" is defined as a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In this description and in the claims, a "cloud-computing environment" is an environment in which cloud computing is employed.

Figure 7:
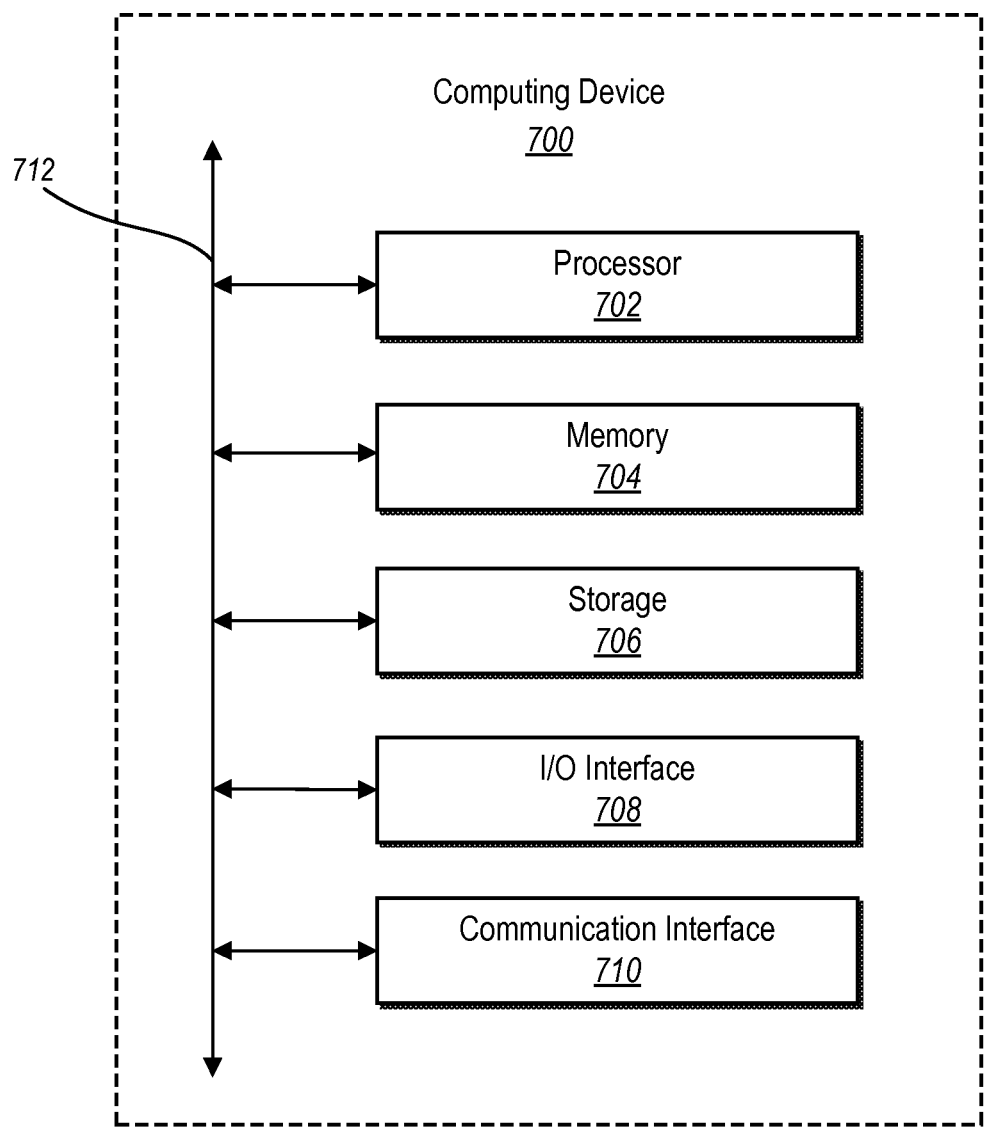
FIG. 7 illustrates a block diagram of an exemplary computing device in accordance with one or more embodiments.

FIG. 7 illustrates a block diagram of an exemplary computing device 700 that may be configured to perform one or more of the processes described above. One will appreciate that the segmenting system 100 may be implemented by one or more computing devices such as the computing device 700. In particular, any of the client devices 112a-112d, the third-party network server(s) 116, the analytics engine 104, the analytics database 108, and the network 124 can comprise a computing device 700. As shown by FIG. 7, the computing device 700 can comprise a processor 702, memory 704, a storage device 706, an I/O interface 708, and a communication interface 710, which may be communicatively coupled by way of a communication infrastructure 712. While an exemplary computing device 700 is shown in FIG. 7, the components illustrated in FIG. 7 are not intended to be limiting. Additional or alternative components may be used in other embodiments. Furthermore, in certain embodiments, the computing device 700 can include fewer components than those shown in FIG. 7. Components of the computing device 700 shown in FIG. 7 will now be described in additional detail.

In particular embodiments, the processor 702 includes hardware for executing instructions, such as those making up a computer program. As an example and not by way of limitation, to execute instructions, the processor 702 may retrieve (or fetch) the instructions from an internal register, an internal cache, the memory 704, or the storage device 706 and decode and execute them. In particular embodiments, the processor 702 may include one or more internal caches for data, instructions, or addresses. As an example and not by way of limitation, the processor 702 may include one or more instruction caches, one or more data caches, and one or more translation lookaside buffers (TLBs). Instructions in the instruction caches may be copies of instructions in the memory 704 or the storage 706.

The memory 704 may be used for storing data, metadata, and programs for execution by the processor(s). The memory 704 may include one or more of volatile and non-volatile memories, such as Random Access Memory ("RAM"), Read Only Memory ("ROM"), a solid state disk ("SSD"), Flash, Phase Change Memory ("PCM"), or other types of data storage. The memory 704 may be internal or distributed memory.

The storage device 706 includes storage for storing data or instructions. As an example and not by way of limitation, the storage device 706 can comprise a non-transitory storage medium described above. The storage device 706 may include a hard disk drive (HDD), a floppy disk drive, flash memory, an optical disc, a magneto-optical disc, magnetic tape, or a Universal Serial Bus (USB) drive or a combination of two or more of these. The storage device 706 may include removable or non-removable (or fixed) media, where appropriate. The storage device 706 may be internal or external to the computing device 700. In particular embodiments, the storage device 706 is non-volatile, solid-state memory. In other embodiments, the storage device 706 includes read-only memory (ROM). Where appropriate, this ROM may be mask programmed ROM, programmable ROM (PROM), erasable PROM (EPROM), electrically erasable PROM (EEPROM), electrically alterable ROM (EAROM), or flash memory or a combination of two or more of these.

The I/O interface 708 allows a user to provide input to, receive output from, and otherwise transfer data to and receive data from the computing device 700. The I/O interface 708 may include a mouse, a keypad or a keyboard, a touch screen, a camera, an optical scanner, network interface, modem, other known I/O devices or a combination of such I/O interfaces. The I/O interface 708 may include one or more devices for presenting output to a user, including, but not limited to, a graphics engine, a display (e.g., a display screen), one or more output drivers (e.g., display drivers), one or more audio speakers, and one or more audio drivers. In certain embodiments, the I/O interface 708 is configured to provide graphical data to a display for presentation to a user. The graphical data may be representative of one or more graphical user interfaces and/or any other graphical content as may serve a particular implementation.

The communication interface 710 can include hardware, software, or both. In any event, the communication interface 710 can provide one or more interfaces for communication (such as, for example, packet-based communication) between the computing device 700 and one or more other computing devices or networks. As an example and not by way of limitation, the communication interface 710 may include a network interface controller (NIC) or network adapter for communicating with an Ethernet or other wire-based network or a wireless NIC (WNIC) or wireless adapter for communicating with a wireless network, such as a WI-FI.

Additionally or alternatively, the communication interface 710 may facilitate communications with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, the communication interface 710 may facilitate communications with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination thereof.

Additionally, the communication interface 710 may facilitate communications various communication protocols. Examples of communication protocols that may be used include, but are not limited to, data transmission media, communications devices, Transmission Control Protocol ("TCP"), Internet Protocol ("IP"), File Transfer Protocol ("FTP"), Telnet, Hypertext Transfer Protocol ("HTTP"), Hypertext Transfer Protocol Secure ("HTTPS"), Session Initiation Protocol ("SIP"), Simple Object Access Protocol ("SOAP"), Extensible Mark-up Language ("XML") and variations thereof, Simple Mail Transfer Protocol ("SMTP"), Real-Time Transport Protocol ("RTP"), User Datagram Protocol ("UDP"), Global System for Mobile Communications ("GSM") technologies, Code Division Multiple Access ("CDMA") technologies, Time Division Multiple Access ("TDMA") technologies, Short Message Service ("SMS"), Multimedia Message Service ("MMS"), radio frequency ("RF") signaling technologies, Long Term Evolution ("LTE") technologies, wireless communication technologies, in-band and out-of-band signaling technologies, and other suitable communications networks and technologies.

The communication infrastructure 712 may include hardware, software, or both that couples components of the computing device 700 to each other. As an example and not by way of limitation, the communication infrastructure 712 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination thereof.

In the foregoing specification, the present disclosure has been described with reference to specific exemplary embodiments thereof. Various embodiments and aspects of the present disclosure(s) are described with reference to details discussed herein, and the accompanying drawings illustrate the various embodiments. The description above and drawings are illustrative of the disclosure and are not to be construed as limiting the disclosure. Numerous specific details are described to provide a thorough understanding of various embodiments of the present disclosure.

The present disclosure may be embodied in other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel with one another or in parallel with different instances of the same or similar steps/acts. The scope of the present application is, therefore, indicated by the appended claims rather than by the foregoing description. All changes that come within the meaning and range of equivalency of the claims are to be embraced within their scope.

What is claimed is:

1. A method for sequentially segmenting a data set comprising:
   providing, by a server device to a client device, a graphical user interface, the graphical user interface comprising a query type control;
   providing, in response to receiving a sequential query type via the query type control:
   a first event control,
   a second event control, and
   a sequential control comprising two or more sequence operators each with at least one associated specific dimension item value;
   receiving, via the first event control, parameters for a first event;
   receiving, via the second event control, parameters for a second event;
   receiving, via the sequential control, a first sequence condition that defines a segment of users who performed the first event followed by the second event in a sequence defined by the two or more sequence operators and the associated specific dimension item values;
   querying, by the server device, an analytics database for the segment of users who performed the first event followed by the second event in the sequence defined by the two or more sequence operators and the associated specific dimension item values;
   identifying, from among tracked user data within the analytics database, users who performed the first event followed by the second event in the sequence defined by the two or more sequence operators and the associated specific dimension item values; and
   providing, by the server device, a query result that represents the segment of users for display via the graphical user interface on the client device.

2. The method as recited in claim 1, wherein:
   receiving the first sequence condition comprises receiving the first sequence condition comprising one of: a number of purchases, a number of pages visited, a number of in-application purchases, a number of searches, a number of advertisements engaged; and
   each of the associated specific dimension item values comprises at least one of: one or more specific products purchased, one or more specific pages visited, one or more specific applications from which the in-application purchases were made, one or more specific search queries, one or more specific advertisements engaged, or a campaign of advertisements.

3. The method as recited in claim 1, wherein each of the associated specific dimension item values comprises a plurality of dimension item values.

4. The method as recited in claim 1, further comprising, after providing the query result, receiving a second sequence condition via the graphical user interface;
   querying, by the server device, the analytics database for an updated segment of users who performed the first event followed by the second event according to the first sequence condition and the second sequence condition;
   identifying, from among the tracked user data within the analytics database, users who performed the first event followed by the second event according to the first sequence condition and the second sequence condition; and
   updating the query result in the graphical user interface on the client device to reflect an updated query result that represents the updated segment of users.

5. The method as recited in claim 4, wherein the second sequence condition is defined by at least one additional sequence operator with at least one associated specific dimension item value.

6. The method as recited in claim 4, wherein the second sequence condition comprises a time-based sequence condition.

7. The method as recited in claim 1, wherein the associated specific dimension item values defined in the first sequence condition comprises a variable.

8. The method as recited in claim 7, wherein the variable comprises one or more of a value, a regular expression, or an array of possible values.

9. The method as recited in claim 1, wherein the parameters for the first event and the parameters for the second event specify actions performed by a user.

10. The method as recited in claim 9, wherein the actions performed by the user comprise one or more of requesting a webpage, downloading data, uploading data, instantiating an application, or submitting a transaction.

11. A non-transitory computer-readable medium storing instructions thereon that, when executed by at least one processor, causes the at least one processor to:

provide, to a client device, a graphical user interface, the graphical user interface comprising a query type control;
provide, in response to receiving a sequential query type via the query type control:
a first event control,
a second event control, and
a sequential control comprising two or more sequence operators each with at least one associated specific dimension item value;
receive, via the first event control, a parameter for an initial event;
receive, via the second event control, a parameter for a subsequent event;
receive, via the sequential control, a first sequence condition that defines a segment of users who performed the initial event followed by the subsequent event in a sequence defined by the two or more sequence operators and the associated specific dimension item values;
query an analytics database for the segment of users who performed the initial event followed by the subsequent event in the sequence defined by the two or more sequence operators and the associated specific dimension item values;
identify, from among tracked user data within the analytics database, users who performed the initial event and then performed the subsequent event in the sequence defined by the two or more sequence operators and the associated specific dimension item values; and
provide a query result that represents the segment of users for display via the graphical user interface on the client device.

12. The non-transitory computer-readable medium as recited in claim 11, wherein querying the analytics database for the segment of users who performed the initial event followed by the subsequent event in the sequence defined by the two or more sequence operators and the associated specific dimension item values comprises querying a segment of users who performed the initial event followed by the subsequent event in the sequence defined by the two or more sequence operators and the associated specific dimension item values, the associated specific dimension item values being any item of the dimension.

13. The non-transitory computer-readable medium as recited in claim 11, further storing instructions thereon that, when executed by the at least one processor, causes the at least one processor to:
after providing the query result, receive a second sequence condition via the graphical user interface;
query the analytics database for an updated segment of users who performed the initial event followed by the subsequent event according to the first sequence condition and the second sequence condition;
identify, from among the tracked user data within the analytics database, users who performed the initial event followed by the subsequent event according to the first sequence condition and the second sequence condition; and
update the query result in the graphical user interface on the client device to reflect an updated query result that represents the updated segment of users.

14. The non-transitory computer-readable medium as recited in claim 11, wherein each of the associated specific dimension item values comprises one or more of a single item variable, an item type variable, a plurality of item variables, or a plurality of item type variables.

15. A system for sequentially segmenting a data set comprising:
at least one processor; and
at least one non-transitory computer readable storage medium storing instructions thereon, that, when executed by the at least one processor, cause the system to:
provide, to a client device, a graphical user interface, the graphical user interface comprising a first query type control;
provide, in response to receiving a sequential query type via the first query type control:
a first event control,
a second event control, and
a first sequential control comprising two or more sequence operators each with at least one associated specific dimension item value;
receive, via the first event control, parameters for a first event;
receive, via the second event control, parameters for a second event;
receive, via the first sequential control, a first sequence condition that defines a segment of users who performed the first event followed by the second event in a sequence defined by the two or more sequence operators and the associated specific dimension item values;
query an analytics database for a first segment of users who performed the first event followed by the second event in the sequence defined by the two or more sequence operators and the associated specific dimension item values;
identify, from among tracked user data within the analytics database, a first group of users who performed the first event followed by the second event in the sequence defined by the two or more sequence operators and the associated specific dimension item values; and
provide a query result that represents the first segment of users for display via the graphical user interface on the client device.

16. The system as recited in claim 15,
further comprising instructions that, when executed by the at least one processor, cause the system to receive, via a frequency control in the graphical user interface, a frequency threshold, wherein the frequency threshold defines a number of times a segment rule is satisfied within a predetermined period of time, wherein the segment rule comprises the first event followed by the second event according to the sequence defined by the two or more sequence operators and the associated specific dimension item values.

17. The system as recited in claim 15, further comprising instructions that, when executed by the at least one processor, cause the system to provide analytical information from the analytics database associated with the first segment of users.

18. The system as recited in claim 17, wherein the analytical information from the analytics database associated with the first segment of users comprises one or more of events performed by each of the first segment of users, a timestamp associated with each of the one or more events performed by each of the first segment of users, tracking data associated with each of the first segment of users, demographic data associated with each of the first segment of users, or transaction data associated with each of the first segment of users.

19. The system as recited in claim 15, wherein the graphical user interface further comprises a nested query type control nested with the first query type control, the nested query type control comprising a third event control and a second sequential control comprising at least one sequence operator.

20. The system as recited in claim 19, further storing instructions thereon that, when executed by the at least one processor, cause the system to:

- receive, via the third event control, parameters for a third event;
- receive, via the second sequential control, a second sequence condition;
- in response to identifying the first group of users, query the first segment of users for a nested segment of users who further performed the third event according to a sequence defined by the second sequence condition;
- in response to querying the first segment of users for the nested segment of users, identify, from among tracked user data within the analytics database, a second group of users corresponding to the nested segment of users; and
- update the query result to represent the nested segment of users within the graphical user interface on the client device.

* * * * *